April 10, 1945.    C. K. SALISBURY    2,373,265
TRACER CONTROLLED MECHANISM
Filed April 19, 1940    10 Sheets-Sheet 5

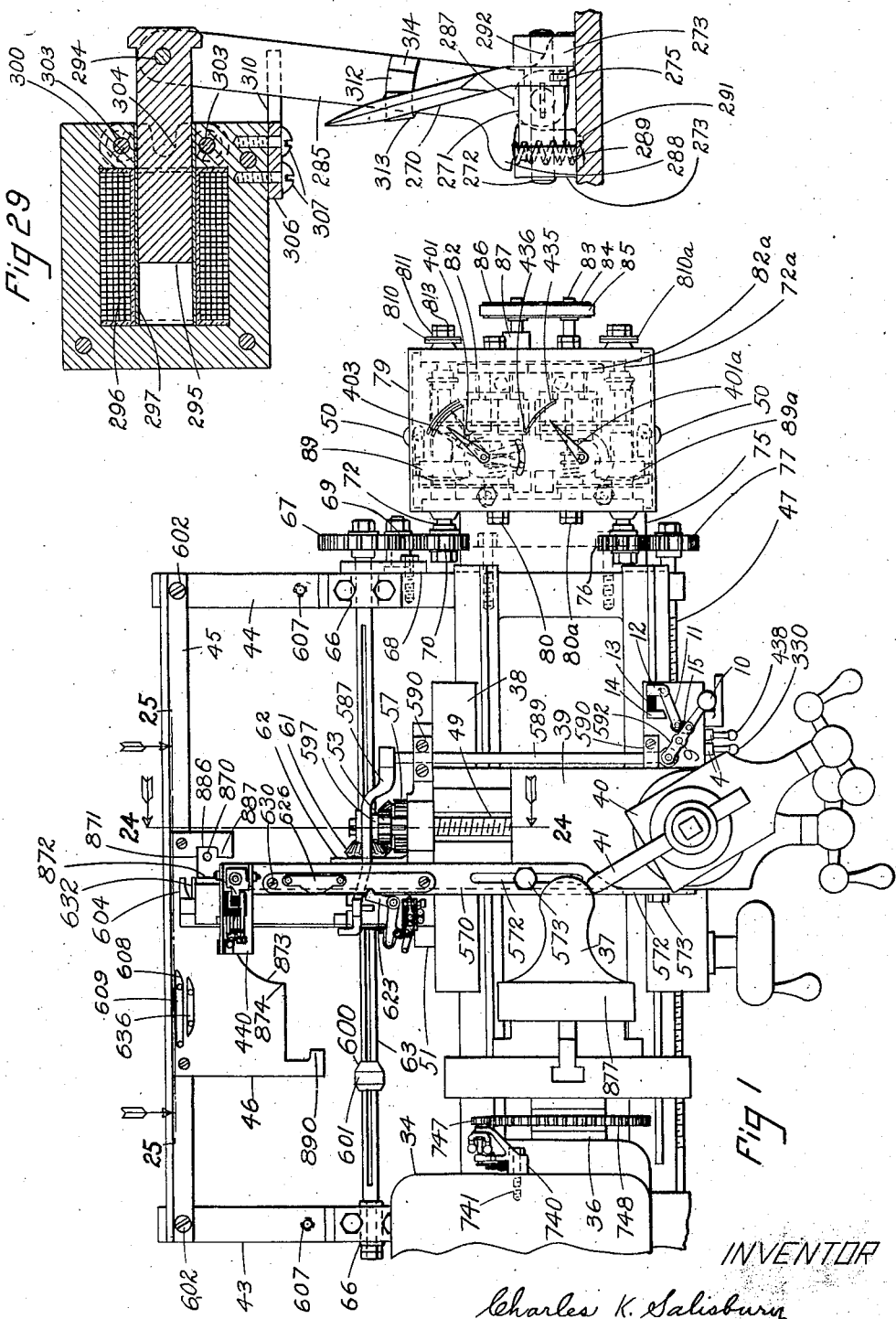

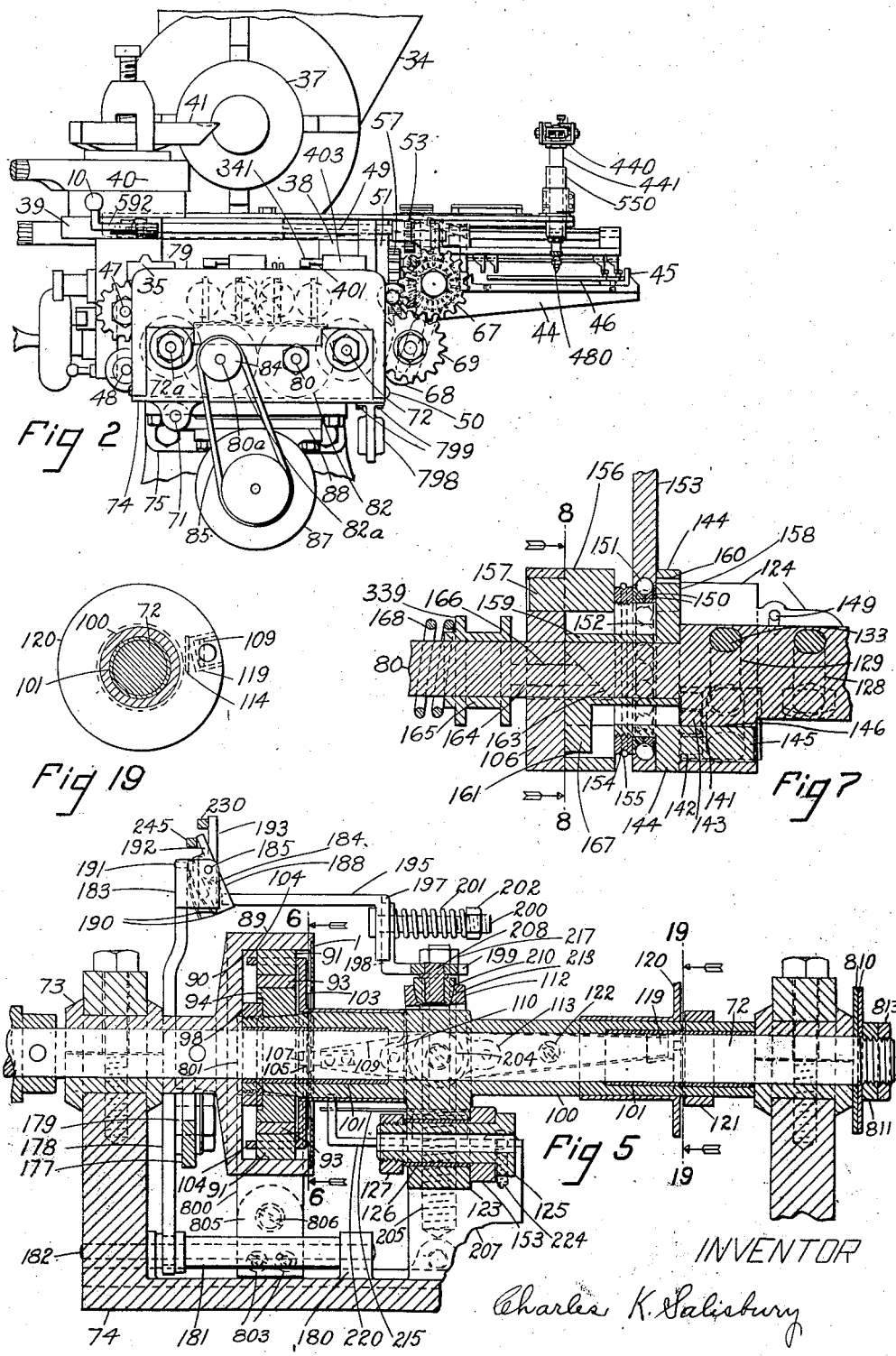

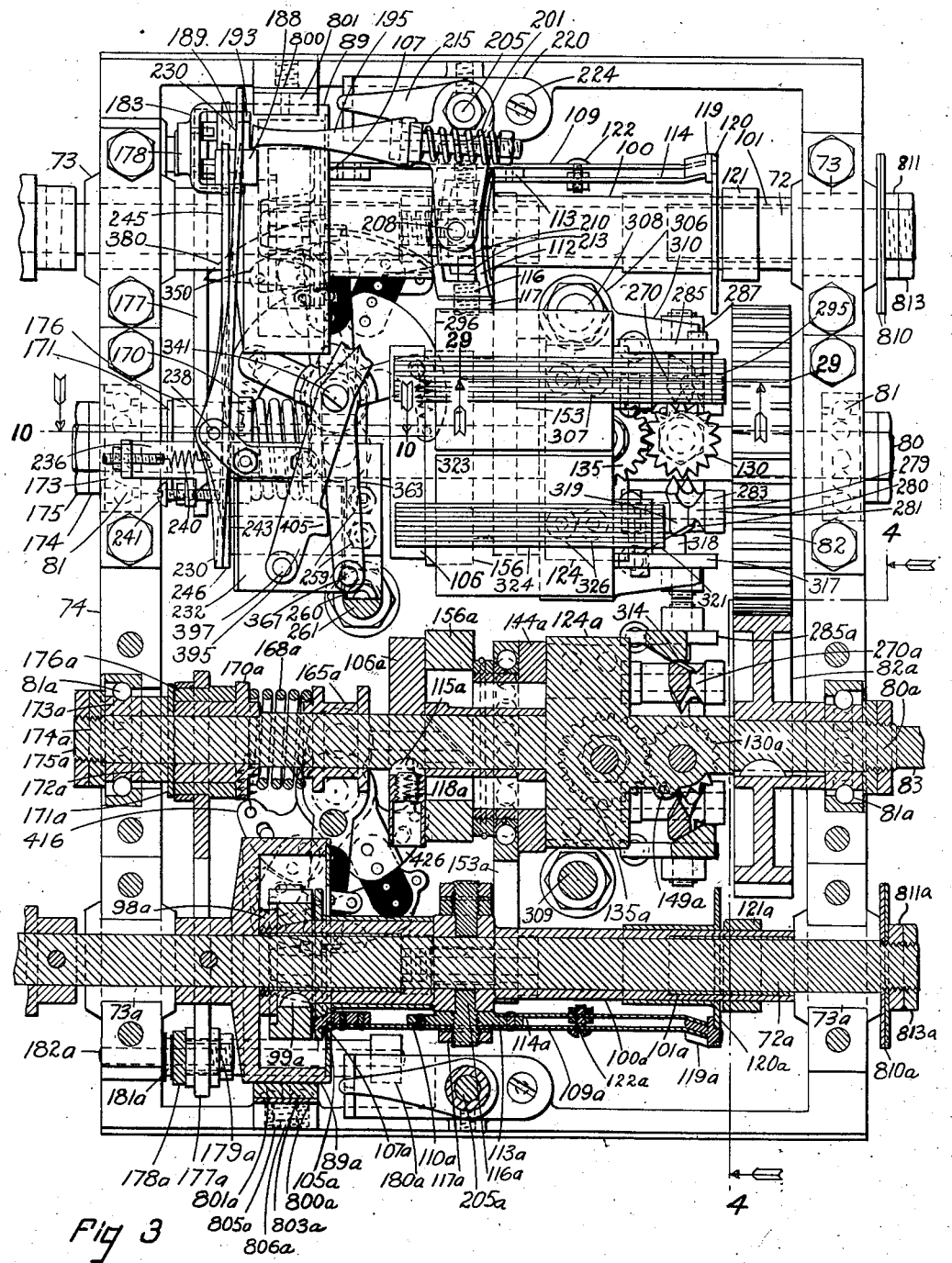

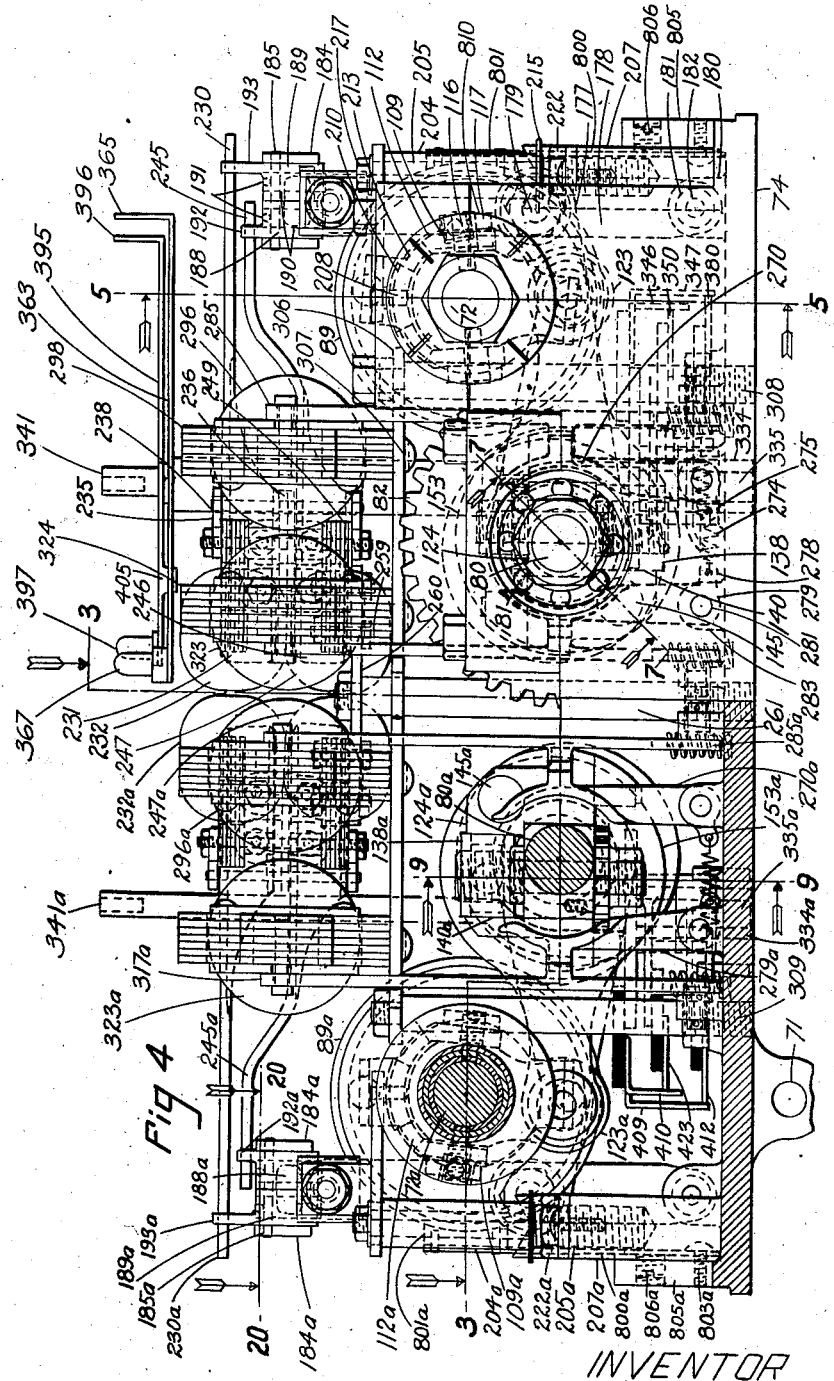

INVENTOR
Charles K. Salisbury

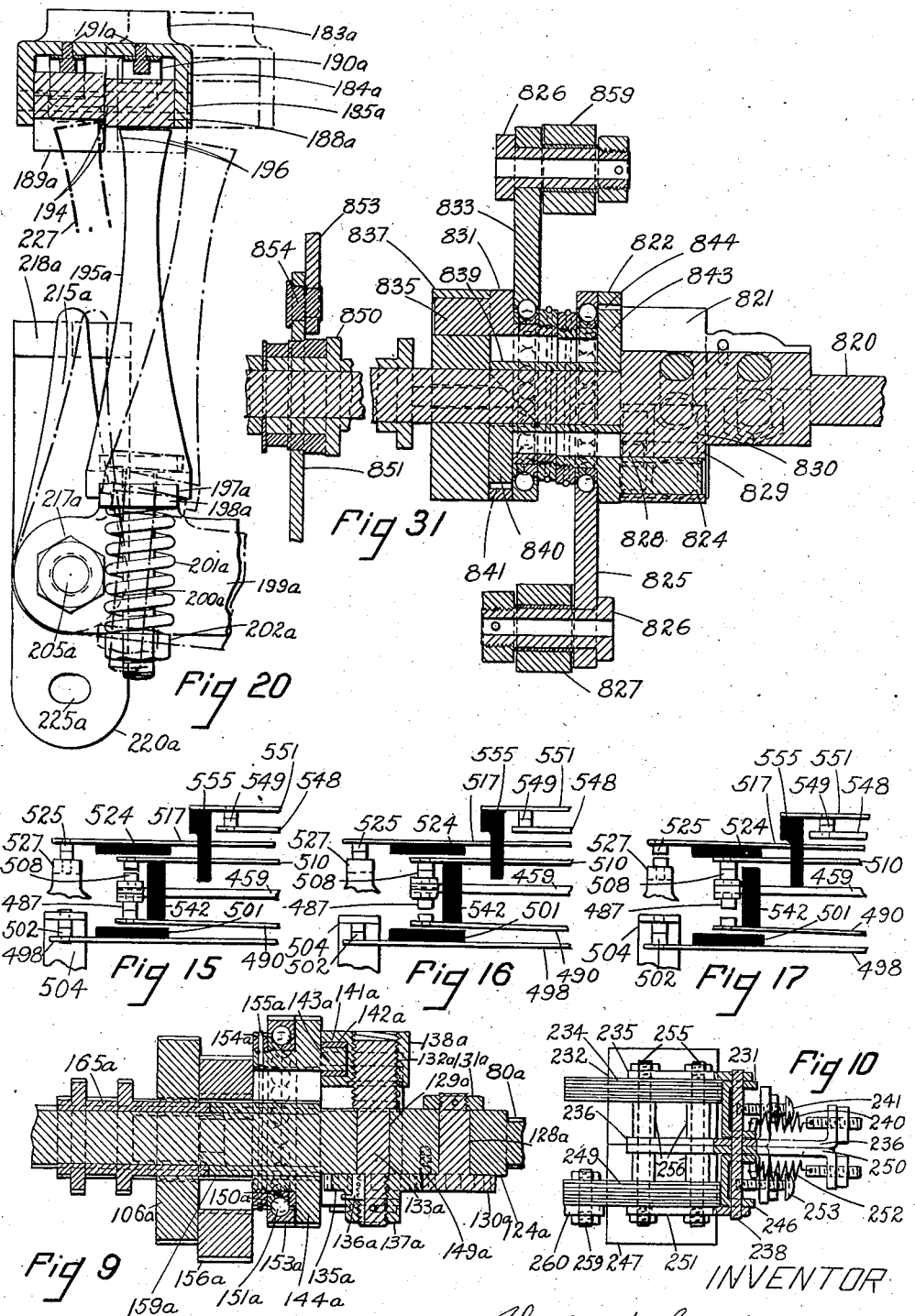

April 10, 1945. C. K. SALISBURY 2,373,265
TRACER CONTROLLED MECHANISM
Filed April 19, 1940 10 Sheets-Sheet 7
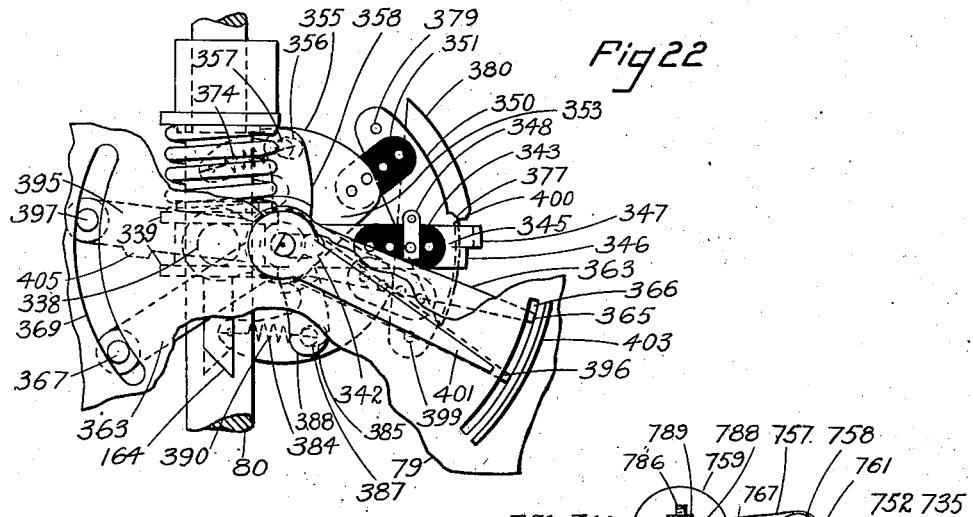
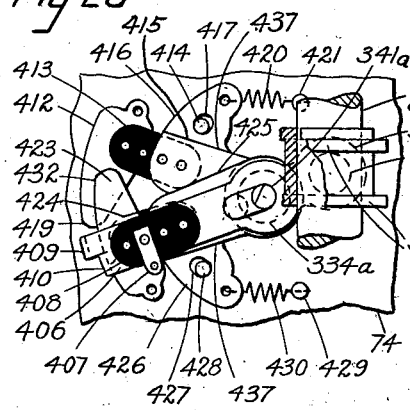
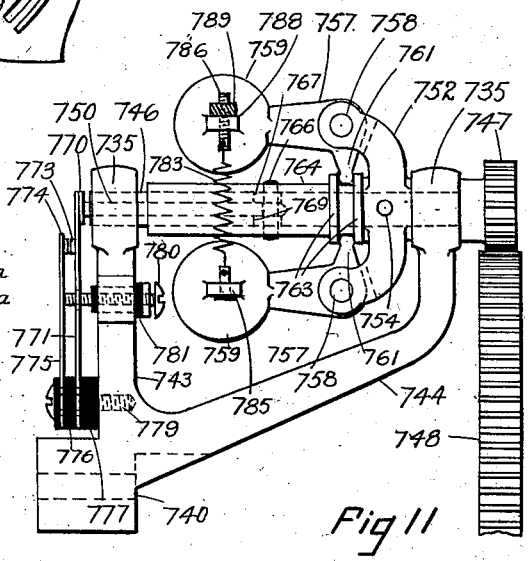
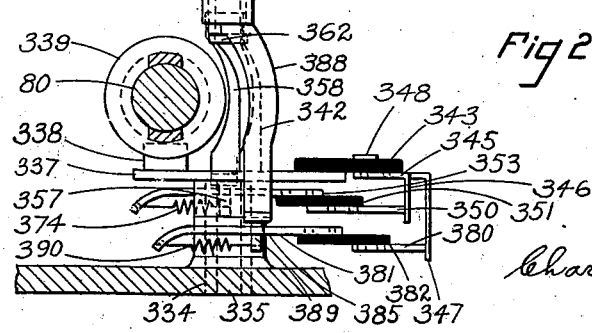
INVENTOR
Charles K. Salisbury

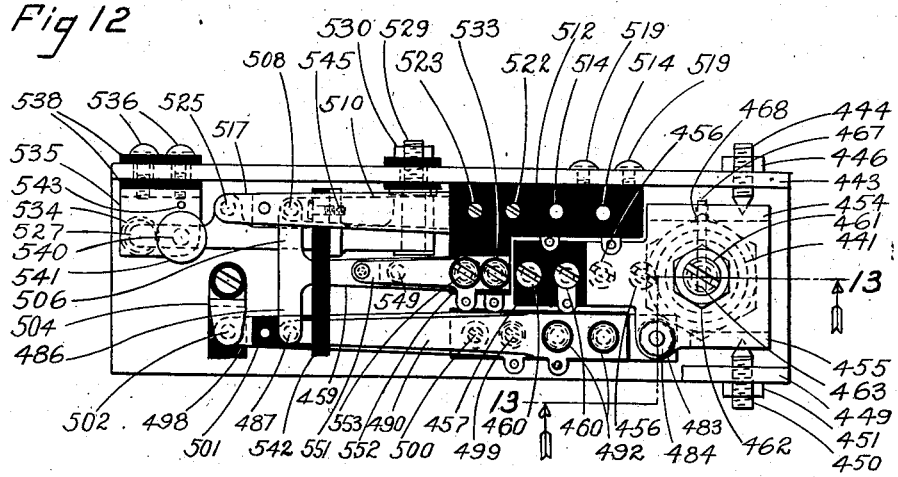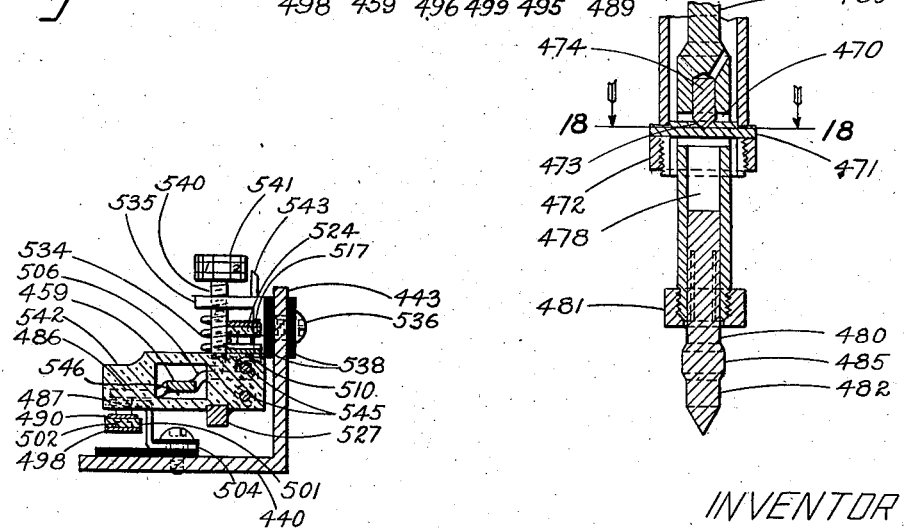

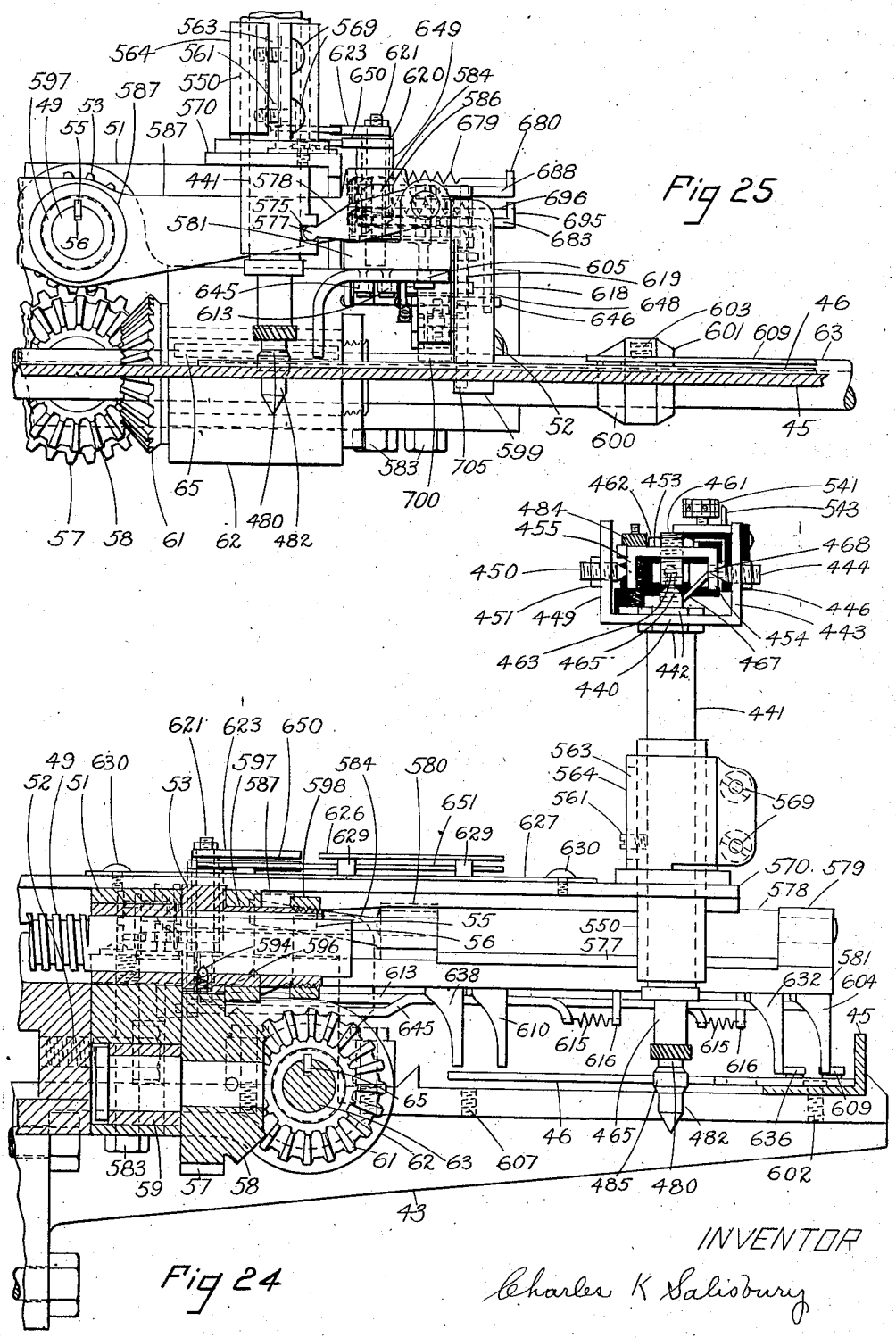

April 10, 1945.  C. K. SALISBURY  2,373,265
TRACER CONTROLLED MECHANISM
Filed April 19, 1940   10 Sheets-Sheet 10
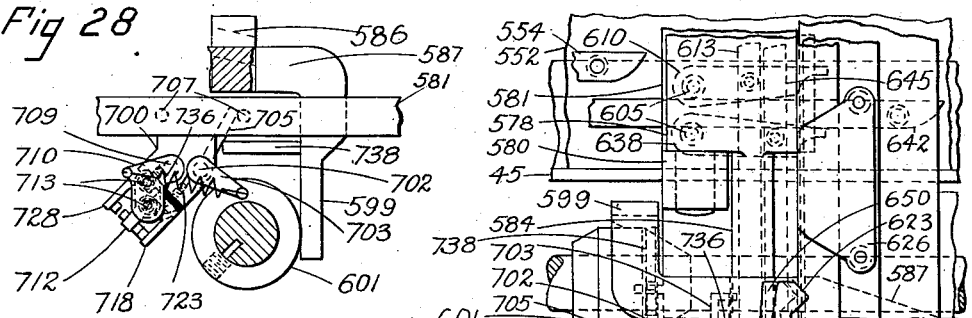
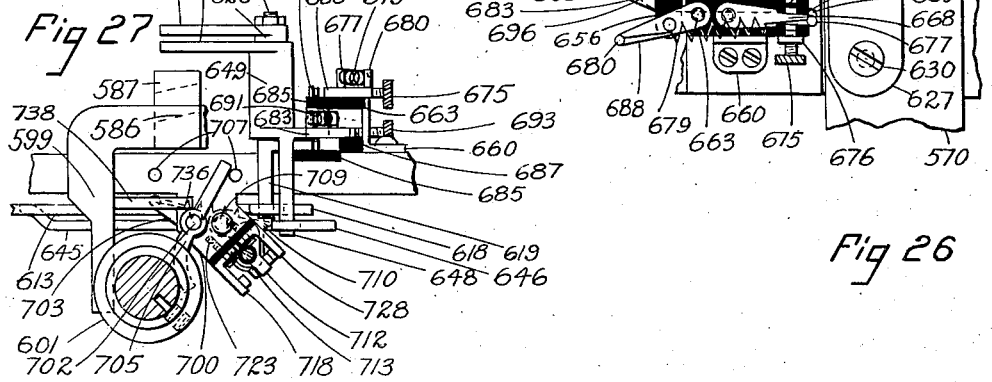
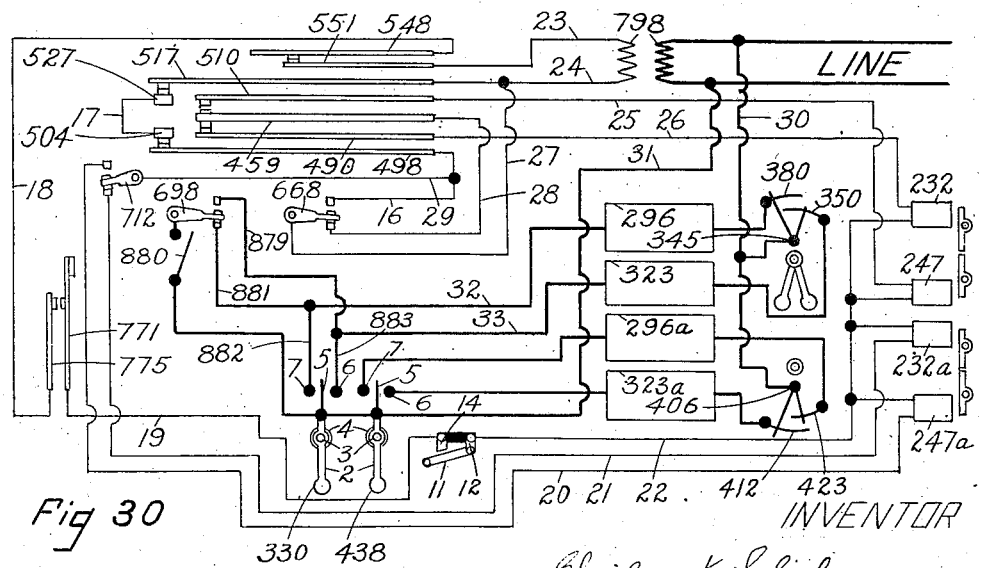
INVENTOR
Charles K. Salisbury Patented Apr. 10, 1945

2,373,265

UNITED STATES PATENT OFFICE 2,373,265

TRACER CONTROLLED MECHANISM

Charles K. Salisbury, Waterloo, Iowa

Application April 19, 1940, Serial No. 330,525

38 Claims. (Cl. 82—14)

My invention relates to tracer controlled mechanism.

The objects of my invention are; to provide a reciprocating mechanism adapted to operate a positive drive clutch at high speed in either direction without shock, to provide means to give positive clutch engagement at the point of motion reverse and to maintain the engagement until the motion is completed, to provide means to vary the extent of the reciprocated movement to vary rotative speed, to provide remote control mechanism for varying the reciprocating movement, to provide means whereby the reciprocating movement is automatically varied by movement of the tracer mechanism, to provide means whereby a balance of moving parts is automatically maintained for varying reciprocating movements, to provide means to give quick response of the clutch to pattern variation, to provide a clutch in which the same driving member is adapted to engage in either direction, to provide a counterbalance for the driving members and their positioning mechanism that will prevent improper engagement of a driving member due to inertia forces developed by reciprocating motion, to provide a universally movable tracer adapted for complete feed control without intervening relays, to provide a tracer having a single adjustment to vary overlapping of the cross and transverse feeds equally in both directions, to provide means to automatically vary the tracer control when machining surfaces parallel with the feeding movement, to provide a stop for the feed controlled by the spindle rotation, to provide means for varying the position of the tracer point relative to the pattern to clear the pattern when the feed mechanism is thrown out of operation, to provide automatic tracer resetting and reversal of feed direction, and to provide a clutch mechanism for operation by low voltage alternating current.

With the above and other objects in view, my invention comprises the herein described tracer controlled mechanism and all equivalents.

Figure 1 is a plan view of a lathe equipped with the mechanism herein described.

Figure 2 is an end view of the mechanism shown in Figure 1.

Figure 3 is a plan view of the clutch operating and controlling mechanism with its protective cover removed and sectioned on line 3—3 of Figure 4.

Figure 4 is an end view of the mechanism shown in Figure 3 and sectioned on line 4—4 of Figure 3.

Figure 5 is a cross section of the clutch mechanism taken on line 5—5 of Figure 4.

Figure 7 is a longitudinal section of the variable stroke crank shaft and its counterbalance taken on line 7—7 of Figure 4.

Figure 9 is a longitudinal section of the variable stroke crank shaft and its counterbalance taken on line 9—9 of Figure 4.

Figure 10 is a side view of one set of the clutch control magnets sectioned on line 10—10 of Figure 3.

Figure 11 is a view of the spindle rotation controlled feed stop.

Figure 12 is a plan view of the tracer.

Figure 13 is a side view of the tracer sectioned on line 13—13 of Figure 12.

Figure 14 is a cross-sectional view of the tracer taken on line 14—14 of Figure 13.

Figure 15 is a diagrammatic showing of the tracer showing the contacts as positioned when the tracer point is slightly deflected to give both in-feed and longitudinal feed.

Figure 16 shows the tracer with a greater deflection of the point than shown in Figure 15, to give out-feed and longitudinal feed.

Figure 17 shows a further deflection of the point than shown in Figure 16, with the out-feed operative but the longitudinal feed inoperative.

Figure 19 is a view of the inertia counterbalance in its deflected position.

Figure 20 is a plan view of the hook-up mechanism to operate the clutch by power, sectioned on line 20—20 of Figure 4.

Figure 21 is a side view of the variably-set crank throw limit switch and its indicator.

Figure 22 is a plan view of the switch shown in Figure 21.

Figure 23 is a plan view of the non-variable limit switch co-operating with manual operation by remote control.

Figure 24 is a cross-sectional view taken on line 24—24 of Figure 1, showing the cross feed operating mechanism and the tracer in position for making a roughing cut.

Figure 25 is a view taken on line 25—25 of

Figure 1 of the mechanism shown in Figure 24.

Figure 26 is a plan view showing the automatic switches and also the automatic reversing switch.

Figure 27 is an end view of the switch mechanism shown in Figure 26.

Figure 28 is an opposite end view to that shown in Figure 27, showing the automatic reversing switch.

Figure 29 is a side view of one of the feed change control coils and co-operating mechanism, sectioned through the coil on line 29—29 of Figure 3.

Figure 30 is a diagram of the electric connections.

Figure 31 is a sectional view of an alternate form of variable throw crankshaft where both clutch members are reciprocated by a single crankshaft.

Figure 32:
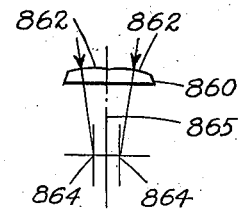

Figure 32 is an end view of an alternate form of clutch plate.

It will be noted that to show a complete operable mechanism, the lathe has been chosen for illustration. It is understood that any mechanism controlled in its operation by a tracer guided by a pattern is included in the invention.

A lathe having a bed 35, Figures 1 and 2, is provided with a power rotated spindle 36 which is adapted to carry a work piece 37.

A carriage 38 slides on the bed and carries a cross slide 39 which is provided with a compound rest 40 on which is secured a cutting tool 41 to operate on the work.

Two brackets 43 and 44, Figures 1 and 2, are secured to the rear of the lathe bed. These brackets carry a pattern support 45 which is machined in planes parallel with the lathe center.

A tracer controlling pattern 46 is removably attached to the pattern support.

The carriage is moved in either direction by a lead screw 47 or by a feed rod 48 (Figure 2), as most convenient.

The cross slide is moved in either direction by a cross feed screw 49 which has its outer end supported in bearings in a bracket 51 rigidly secured to the carriage by bolts 52 (Figures 24 and 25).

The end of the cross feed screw carries a slidable gear pinion 53 which is provided with a driving key 55 (Figures 24 and 25) engaging a slot 56 in the screw.

The pinion 53 may be moved to engage for drive by a gear 57 integral with a miter gear 58 and having bearings 59 (Figure 24) in the bracket 51.

The miter gear meshes with a like gear 61 (Figures 1, 24 and 25) having its bearings in an extension 62 of the bracket.

A splined shaft 63 (Figures 1, 24 and 25) extends through the miter gear 61 which it drives by a key 65 (Figures 24 and 25). This shaft is supported in bearings 66 in the brackets 43 and 44 and has a gear 67 (Figures 1 and 2) secured to its end to mesh with an idler gear 69 carried by an idler bracket 68 which is adjustably clamped in the usual manner.

A gear pinion 70 (Figure 1) meshes with the idler gear and is secured to the end of a clutch shaft 72 (Figures 1, 2, 3, 4, 5 and 6) which is supported in bearings 73 (Figures 3, 4 and 5) in a clutch case 74 secured to the end of the lathe bed by a bracket 75 (Figures 1 and 2).

A second clutch shaft 72a is of like construction as the shaft 72 and is rotatably secured to the clutch case by like bearings 73a (Figure 3). It is provided with a gear pinion 76 secured to its end to mesh with a gear 77 secured to the lead screw 47 (Figure 1).

A crank shaft 80, Figures 1, 2, 3, 4, 7, 8 and 9, is supported by ball bearings 81 (Figures 3 and 4) to the clutch case and serves to operate the clutch shaft 72.

This crank shaft carries a gear 82 (Figures 1, 2, 3 and 4) which meshes with a like gear 82a for drive by a second crank shaft 80a which carries this gear and is supported by ball bearings 81a to the clutch case.

The crank shaft 80a operates the clutch shaft 72a and is provided with an extended end 83 (Figures 1, 2 and 3) which carries a pulley 84 driven by a belt 85 from a pulley 86 on a motor 87 (Figures 1 and 2). The motor is secured to a swinging bracket 88 which is pivoted at 71 to the bottom of the clutch case (Figure 2).

It will be noted that the clutch shaft 72 and the crank shaft 80, with associated parts, comprise a unit controlling the cross slide. The clutch shaft 72a and the crank shaft 80a form an identical unit to control the carriage.

The corresponding parts in the separate units therefore carry the same reference number with the addition of the letter "a" for all parts of the unit controlling the carriage. The description of, or reference to, any part in one unit will be understood to apply to the like part in the other unless special reference is required.

A protective cover 79, Figures 1 and 2, which should also be adapted to reduce sound effects, is secured to the clutch case by means of screws 50.

Figure 6:
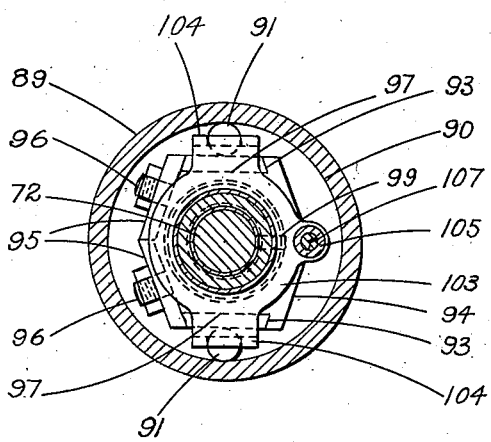
Figure 6 is a cross section of the roller clutch assembly taken on line 6—6 of Figure 5.

A driven clutch member 89, Figures 1, 3, 4, 5 and 6, of rigid but light construction, is secured to rotate the clutch shaft 72. It has a cylindrical bore 90 (Figures 5 and 6) which is hardened and ground true with the shaft. Two clutch rollers 91 (Figures 5 and 6), of hardened and ground material, are placed in position between the bore and hardened clutch plates 93 which are ground flat on their contact face. The clutch plates are rigidly clamped in dove-tailed slots in a clutch head 94 by two clamp plates 95 which are held in position by bolts 96 (Figure 6). The clutch plates are adjusted in their setting to permit of a clearance of approximately four one-thousandths of an inch between the roller and the bore at the point of greatest clearance. Shims may be placed below the clutch plate at the point 97 (Figure 6) for this adjustment.

The clutch head is provided with a tapered bore and is rigidly fixed by a nut 98 (Figure 5) and a key identical with that shown at 99a in Figure 3 to one end of an oscillating sleeve 100 (Figures 3 and 5) which has a close bearing fit on the clutch shaft 72.

A cage 103, Figures 5 and 6, of very light but rigid construction, is fitted to the sleeve for slight oscillating movement thereon.

At points opposite to each other, the cage has parallel ears 104 in which are openings to closely hold the clutch rollers in parallel position between the bore 90 and the clutch plates.

Extending through a reinforced opening 105 (Figures 3, 5 and 6) at 90 degrees relative to the ears, is a driving projection 107 of an inertia counterbalancing lever 109, Figures 3 and 5. This lever is solidly riveted to the projection 110 of a transfer yoke 112 and is also riveted to a second projection 113 of the yoke with a spring arm 114.

The yoke has a swinging connection to the oscillating sleeve through pivot pins 116 which screw through the yoke and have bearings in the sleeve diametrically opposite to each other. They are securely locked in position in the yoke by jam nuts 117.

The lever 109 is of the same spring material as that of the spring arm 114 and has its end opposite to the projection 107 formed to engage a projection 119 riveted to an inertia counterbalance 120. This also has a slight oscillating movement on the sleeve and is moved in a direction opposite to the cage by the lever connection. A collar 121 is forced on the sleeve to hold the counterbalance in position.

The spring arm 114 and the corresponding end of the lever 109 are drawn toward each other by an adjusting screw 122, Figures 3 and 5, to provide a tension between their ends to act on the projection 119. This serves to bring the clutch rollers and cage, and also the inertia counterbalance, to their central position when moved therefrom in either direction. This action is shown in Figure 19.

The crank shaft 80 is provided with a crank head 124, Figures 3, 4, 7, 8 and 9, which is formed integral with the shaft for rigid construction. The head is cross-drilled at 128 at one side of the bearing center of the shaft. It is also cross-drilled at 129 in line with the drilling 128 (Figures 3, 4, 7 and 9). A star gear wheel 130 has its integral shaft inserted in the drilling 128 in which it is rotatably held by a locked nut 131 (Figure 9).

A crank throw adjusting screw shaft 133 extends through the drilling 129 and has an enlarged threaded end 132 adapted for crank adjustment (Figure 9).

The adjusting screw is held in its rotatable position by a gear wheel 135 which meshes with the star wheel 130. The gear wheel is secured to the shaft 133 by screw threads and by a key 136 (Figure 9) and then locked by a nut 137.

The threaded operating end of the adjusting screw co-operates with an adjusting nut 138 which may slide in a slot 140 (Figures 4, 8 and 9) cut lengthwise in the crank head in line with the drilling 129. The nut 138 has a crosswise slot 141 in which is a close fitting bearing slide 142. A pin 143 (Figures 7 and 9) of a crank throw member 144 has close bearings in the slide 142.

The crank throw member has a heavy pivot pin 145 which is made integral therewith for rigid construction. This pin has close fitting bearings in a lengthwise drilling 146 of the crank head.

The crank throw member is swung on its pivot pin by the mechanism above described, by rotative movement of the star wheel to adjust the crank throw. A spring actuated ball detent 149 (Figures 3 and 4) positions the star wheel.

The crank throw member carries two hardened and ground bearing cones 150 which support a series of hardened balls 151 in a hardened and ground race 152 of a connecting rod 153. The free end of the rod is connected to a downward extending arm 123 of the oscillating sleeve by a bolt 125 which passes through the connecting rod and through a bearing sleeve 126. This bearing sleeve is clamped endwise to the connecting rod by a nut 127 to provide a rigid bearing pin (Figure 5).

The cones 150 are rigidly clamped to the crank throw member by a nut 154 which is locked by a spring wire key 155.

A counterbalance support 106 is secured to the crank shaft by a key 115 and a locking set-screw 118 as shown in Figure 3.

Figure 8:
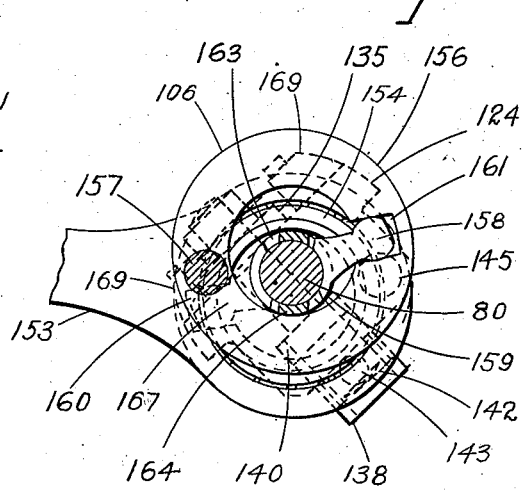
Figure 8 is a cross section of the variable stroke crank shaft and its counterbalance taken on line 8—8 of Figure 7.

A crank throw counterbalance 156 has its integral pivot pin 157 extend through the counterbalance support for bearing at a point equal to 180 degrees relative to the pivot pin 145 (Figure 8).

A counterbalancing lever 159 (Figures 7, 8 and 9) has its bearings on the crank shaft and has an arm 158 which closely engages in a slot 160 cut lengthwise in the crank throw member diametrically opposite to its pivot pin 145. At a point equal to 180 degrees relative to the arm 158, the counterbalancing lever has a second arm 167 (Figures 7 and 8) which engages in an incline slot 161 in the counterbalance opposite to its pivot pin 157.

The lever 159 has two incline faced slots 163 (Figure 7) which are opposite to each other. These engage the end of incline faced projections 164 of an indicator collar 165. This collar is free to slide lengthwise on the crank shaft but is prevented from rotating by the projections contacting the side of slots 166 (Figure 7) in the counterbalance support in which they slide.

A heavy spring 168 (Figures 3 and 7) acts to return the collar. This spring has its base support on an eccentric bushing 170 (Figure 3). This bushing is held to rotate with the crank shaft by a retaining washer 171, a spacer 172, a bearing cone 173, and a nut 174 on the reduced end of the crank shaft. A jam nut 175 locks the parts together.

A bearing sleeve 176 on a connecting rod 177 (Figures 3, 4 and 5) has its bearings on the eccentric bushing for reciprocating motion. The opposite end of the connecting rod 177 is connected to a swinging lever 178 by a bearing pin 179 carried by the lever near its center.

The lower end of the swinging lever is secured to one end of a sleeve 181 which oscillates on a shaft 182 which is supported in bearing projections 180 on the clutch case base.

The upper end of the lever 178 is expanded to form a carrier head 183, Figures 3, 4, 5 and 20, having side walls 184 (Figures 4, 5 and 20) which are drilled crosswise for a pin 185 on which is pivoted two hook-up levers 188 and 189.

The lower ends of the levers are swung outward by light leaf springs 190 which are secured at their upper ends to the carrier head by stop rivets 191 which serve to limit the movement of the levers.

The lever 188 is provided with a short arm 192 extending upward for control contact, while the lever 189 has a longer control arm 193 also extending upward but widely separated from the arm 192.

The hook-up levers are made as light as possible to permit of rapid movements by light spring pressure and are closely supported but freely movable in the carrier head.

Either of the hook-up levers may contact for reciprocated drive, in opposite directions, with the end of an arm 195 which has its opposite end bent downward and provided with a slot 197 (Figures 5 and 20) to provide a rocking seat on an upward extending arm 198 of a lever 199. A bolt 200 passes through them and through a tension spring 201 to provide a flexible connection controlled by an adjusting nut 202.

The lever 199 is rigidly secured to the upper end of a sleeve 204, Figures 4 and 5, which may oscillate on a pivot bolt 205 adjustably secured by a threaded connection to an elevation 207 of the clutch case.

The lever 199 is provided with a pin 208, Figures 3, 4, and 5, which serves as a bearing pivot for a slide block 210 fitted for close sliding movement in a semi-circular slot 213 in the yoke 112. This slot is long enough to permit of the oscillating movement of the clutch sleeve.

The carrier head is shown by full lines in Figure 20 at one limit of its reciprocated movement. The arm 195a is likewise shown in the position it takes when the clutch rollers are held in their central inoperative position through co-operation of the spring arms 109 and 114 and the inertia counterbalance 120.

To more exactly return the clutch rollers to their inoperative position, a stiff detent spring 215 is provided. It is rigidly secured to the lower end of the sleeve 204 and its formed end 216 is held, by a retaining nut 217 on the pivot bolt, in centering spring contact with a notch 218 in the upturned end of a detent plate 220. The plate is located on the pivot bolt and is locked by a nut 222 to the clutch case base in securing the pivot bolt. A screw 224 (Figure 5) in a slotted hole 225 in the detent plate, permits securing in desired adjusted position.

The detent spring, the lever 199 and associated parts, are also shown in full line in the position that they take when the clutch rollers are in their central position. In this position, the hook-up lever 189 is permitted to swing to its full line position as the movement of the carrier head is greater than the width of the contact end of the arm 195.

The sides of the contact arm are formed as shown at 196 and its end hardened (Figure 20). The levers 188 and 189 are slightly recessed at their contact points 194 and also hardened.

Upon movement of the carrier head to near its opposite limit of movement, as indicated by light dash and dot lines (Figure 20), the lever 199 will be swung to its light dash and dot position and the clutch rollers will be forced into driving contact. Any further movement of the carrier head toward its limit of movement will rock the arm on its seat by yielding of the spring 201 and the driving pressure on the clutch rollers will be maintained for a considerable time during the return movement of the carrier head, due to the spring 201.

If the hook-up lever 188 swings to operating position, the arm 195 will be carried to the position shown by the heavy dash and dot lines 227 to force the clutch rollers into operating position for drive in the opposite direction.

It will be noted that when one of the hook-up levers is in operating position, the other is restrained by the end of the arm 195 from also taking that position even though both controlling coils are energized. The first one must be withdrawn before the second may act.

The width of the hook-up levers is sufficient to prevent overthrow contact of the arm 195.

The arm 193 of the hook-up lever 189 has sliding engagement with an extended end 230 (Figures 3, 4 and 5) of an armature 231 which is operated by a control coil 232. A laminated core 234 supports the coil and has two side plates 235 and 236 on which the armature is pivoted by a pin 238. The side plate 236 also supports an adjustable tension spring 240 which has one end fixed to the armature for retraction. It also supports an adjustable stop screw 241 to limit the armature movement.

The spring 240 provides the retractive force to swing the hook-up lever 189 out of engagement with the arm 195 through pressure on the arm 193.

To permit rapid action by small electric power, the armature and its extended end are made as light as possible.

The counteracting springs 190 should also be kept as light as possible.

A very thin non-magnetic shield 243 (Figure 3) is placed between the core and the armature to prevent the armature sticking.

The arm 192 of the hook-up lever 188 engages with an extended end 245 of an armature 246, Figures 4 and 10, to provide for retraction of the hook-up lever. The armature is pivoted on the pin 238 and is operated by a coil 247 (Figures 4 and 10) which is supported by a laminated core 249 and core side plates 250 and 251 (Figure 10). The side plate 250 carries an adjustable retraction spring 252 and also an adjustable stop screw 253.

The coil 247 and its core 249 are identical with the coil 232 and its core and is assembled therewith and directly below by bolts 255 (Figure 10) and spacers 256 to form a control unit. This unit is secured by bolts 259 to a base strip 260 (Figures 3, 4 and 10) which is locked to the top of a post 261 (Figures 3 and 4) which has its lower end secured to the base of the clutch case.

The coil unit comprising coils 232a and 247a and associated mechanism, is also suported by the base strip 260. This unit controls the action of the hook-up levers 188a and 189a.

The extended ends of the armatures must be of correct length to maintain control contact with their hook-up levers at all points of the reciprocated movement of the carrier heads.

The star wheel 130, due to being offset relative to the center of the crank shaft, may make operative contact with the edge of a star wheel shifter arm 270, Figures 3, 4 and 29, once every revolution of the crank shaft. The contact edge is of semi-circular form to permit of engagement with the star wheel during a considerable portion of a revolution of the crank shaft.

The shifter arm has its lower end secured to a bearing sleeve 271 (Figure 29) which rocks on a shaft 272 supported by a bearing projection 273 on the base for end support.

The shifter arm is held out of engagement with the star wheel by a spring 274 (Figure 4) which has one end fixed to an arm 275 (Figures 4 and 29) at the lower end of the shifter arm and its other end fixed to a like arm 278 (Figure 3) of a second shifter arm 279 which is secured to a sleeve 280 and rocks on a shaft 281 secured in bearing projections 283 of the base of the clutch case.

The shifter arms 270 and 279 are bent at an angle relative to their sleeves to present a spiral driving edge to the star wheel to rotate it, when engaged, the distance of one tooth for each revolution of the crank shaft, but in opposite directions.

The shifter arm 270 is moved into engagement by a connecting lever 285, Figures 3, 4 and 29, which is pivoted at its lower end to a bearing projection 287 (Figures 3 and 29) on the base.

The lower end of this lever has an arm 288 (Figure 29) to compress a spring 289 supported in a depression 291 in the base to return the lever to its inoperative position. It also has an arm 292 which contacts the base to limit the return movement.

The upper end of the lever 285 is linked by a pin 294 (Figure 29) to the outer end of a laminated plunger 295 which is adapted to be electrically drawn into a coil 296. This coil has a non-magnetic bushing 297 in which the plunger slides and which aids in supporting the coil in a laminated magnet frame 298 by means of side plates 300 and 301 which are secured to the frame by screws 303.

The side plate 300 is provided with a recess 304 to provide clearance for the pin 294 when the lever 285 is in its retracted position.

The coil is supported by means of a common coil support 306 to which the laminated frame 298 is secured by screws 307 as shown in Figures 3, 4 and 29. The coil support is secured to the upper ends of two posts 308 and 309 which have their lower ends secured in the clutch case base.

The coil support is provided with a projection 310 against which the lever 285 slides for side support.

At the height of the crank shaft, the lever 285 is provided with a cam projection 312 adapted to contact with a like projection 313 on the shifter arm 270 and move it into operative contact with the star wheel when the coil is energized. The parts then take the same position as shown for the shifter arm 270a in Figures 3 and 4 where the shifter arm 270a is in operative position. In this position, the shifter arm is locked against side thrust by its cam projection contacting with a flattened surface 314 on the lever 285 as shown in Figures 3 and 29.

The shifter arm 279 is moved into operative contact with the star wheel 130 to rotate it in the direction opposite to that produced by the shifter arm 270, by a connecting lever 317 which is provided with a cam projection 318 adapted to contact a like projection 319 on the shifter arm.

The lever 317 is pivoted at its lower end to the clutch case base and linked at its upper end to the end of a plunger 321 in the manner described for the lever 285.

The plunger 321 is operated by a coil 323 carried by a laminated magnetic frame 324 and secured to the coil support 306, by screws 326, in the manner previously described.

The coil 296a which operates the shifter arm 270a for rotation of the star wheel 130a, and the like coil 323a which operates the shifter arm 279a to rotate it in the opposite direction, are secured to the coil support 306 in the order shown in Figure 4.

The coils 296 and 323 may be controlled by a toggle switch 330 carried on the lathe apron 42, Figure 1, or they may be automatically controlled by means later described. In either case; the limit of rotation of the star wheel 130, in either direction, is determined by mechanism here described.

A vertical bearing sleeve 334 has its lower end secured in the clutch case base at one side of the center line of the crank shaft 72 as shown in Figures 4 and 21.

A shaft 335 is fitted for bearing in the sleeve and carries a lever plate 337 on its upper end secured thereto. The lever plate bears on the upper end of the sleeve and, at a point directly below the crank shaft, is provided with a vertical pin 338 fitting between flanges 339 of the indicator collar 165. The endwise movement of the indicator collar through action of the star wheel swings the lever plate and associated parts on its bearings in the sleeve, Figures 21 and 22.

Directly above and in line with the shaft 335 is an indicator shaft 341, Figures 1, 2, 3, 4, 21 and 22. This shaft has a portion of its lower end curved sidewise to clear the flanges of the indicator collar as shown at 342 in Figures 21 and 22, and is secured to the lever plate to swing therewith.

An insulating plate 343 is secured to the lever plate and carries, insulated therefrom, a contact plate 345.

The plate 345 is provided with spring contact arms 346 and 347 extending downward and electrically connected to a soldering lug 348 (Figures 21 and 22).

The contact arm 346 contacts with the edge of a semi-circular contact plate 350 (Figures 21 and 22) carried by an insulating plate 351 secured to a swinging lever 353 which has its bearings on the sleeve 334. The lever has an arm 355 extending to one side and provided with an elongated opening 356 (Figure 22) through which an end 357 of a downward extending arm 358 protrudes. This arm is secured to the lower end of a sleeve 361 (Figure 21) which has its bearings on a second sleeve 393 which, in turn, is supported by bearing on the indicator shaft. This second sleeve is supported by a collar 362 (Figure 21) secured to the shaft.

The upper end of the sleeve 361 is secured to the center of a setting lever 363 which has a vertical end 365 extending through a slot 366 in the protective cover 79.

At its opposite end, the setting lever is provided with a projection 367 extending upward through a second slot 369 in the cover to permit of manually setting of the contact plate 350 in any position to determine the limit of decrease of crank throw. A collar 371 on the projection is forced against the cover by spring action of the setting lever to securely hold the contact plate in desired position.

The end 357 of the arm 358 is secured to one end of a tension spring 374 which is secured to a downward bent end of the arm 355.

When the crank throw is decreasing, the pressure exerted by the contact arm 346 against the edge of the contact plate 350 will swing it on its bearings on the sleeve 334 and will elongate the spring 374. This swinging movement is limited to the elongation of the opening 356 and continued movement will cause the contact arm 346 to break contact with the contact plate 350 at the point 377 (Figure 22) and an increased opening at this point will be produced by the spring 374 acting to swing the contact plate on its bearing support in the opposite direction.

Electrical connection to the plate 350 is provided at 379 (Figure 22).

The contact arm 347 co-operates with a second contact plate 380 to limit the increase of the crank throw. This plate is insulated from its supporting lever 381 by an insulating plate 382 as shown in Figures 21 and 22.

The lever 381 has its bearing support on the sleeve 334 and is provided with a sidewise extending arm 384 having an elongated opening 385 through which an end 387 of an arm 388 extends. The end 387 is secured to one end of a comparatively light spring 390 which has its other end secured to a downward extending end of the arm 384.

The upper end of the arm 388 is secured to the lower end of the sleeve 393 which has its bearings on the indicator shaft, as before noted.

The upper end of the sleeve 393 is secured to the center of a second setting lever 395 which has a vertical indicating end 396 extending through the slot 366. The opposite end of this lever has a manual setting projection 397 (Figures 3, 4, 21 and 22) which has a collar 398 also forced upward by spring of the setting lever to hold the contact plate 380 in its set position in the manner previously described.

The contact plate 380 has means for electrical connection at 399.

The semi-circular edge of the contact plate 380 has a breaking point 400 (Figure 22) which opens when the star wheel has moved to increase the crank throw to the limit determined by the setting lever 395. This breaking point is further opened by action of the spring 390 in the manner previously described.

An indicator arm 401, Figures 1, 2, 21 and 22, is fitted to the upper end of the indicator shaft 341 above the protective case. Its free end swings adjacent to an index plate 403 secured to the protective case and graduated in any suitable manner.

It will be noted that at least one of the contact plates is always in contact. A stop 405 on the setting lever 395, Figures 3, 4, 21 and 22, permits of the same margin for all positions.

A switch controlling the limit of crank throw of the crank shaft 80a, in both directions, is shown in Figures 3, 4 and 23.

A vertical bearing sleeve 334a (Figure 4) is fixed in the clutch case base to provide bearing for a shaft 335a carrying a lever plate 337a (Figure 23) which has a pin 338a operatively making contact with an indicator collar 165a to swing the lever plate and an indicator shaft 341a secured thereto. These parts are all of the same construction and operation as those previously described.

A contact plate 406, Figure 23, has a connecting lug 407 and is secured by an insulating plate 408 to the swinging lever plate 337a to move therewith.

The contact plate 406 has contact spring arms 409 and 410 (Figures 4 and 23) which extend downward.

The contact arm 409 exerts considerable contact pressure on a semi-circular contact edge of a contact plate 412 carried by an insulating plate 413 secured to a swinging lever 415 which has its bearings on the sleeve 334a.

The swinging lever is provided with an arm 416 extending to one side and provided with an elongated opening 417 through which a pin 414 extends and has its lower end secured in the clutch case base (Figures 3, 4 and 23).

This pin serves to restrict the swinging movement of the contact arm to the extent allowed by the elongation of the opening.

The contact plate 412 serves to limit the increase of crank throw of the crank shaft and when the contact arm 409 has been moved to the position shown in Figure 23, to break contact at 419, Figure 23, a tension spring 420, having one end secured to the arm 416 and the other to a pin 421 secured in the clutch case base, acts to increase the break by swinging the contact plate on its bearings to the limit allowed.

The contact arm 410 makes spring pressure contact with a semi-circular contact edge of a second contact plate 423 which serves to limit the decrease of the crank throw.

The contact plate is secured to an insulating plate 424 secured to a swinging lever 425 having bearings on the sleeve 334a and provided with an arm 426 extending sidewise which is provided with an elongated opening 427 through which a pin 428 extends to limit the swinging movement of the contact plate 423. This pin has its lower end secured in the clutch case base.

A second pin 429 has its lower end secured likewise and is provided with a spring 430 connected thereto and to the arm 426 to swing the contact plate on its bearings when a break takes place at point 432 of the contact plate 423.

The arms 416 and 426 are bent downward at 437 (Figure 23) to bring them close to the clutch case base and to prevent interference.

An indicator arm 401a is fitted to the upper end of the indicator shaft 335a, above the protective cover. Its free end moves adjacent to an index plate 435 secured to the cover. The indexing of this plate is the reverse of that of the index plate 403 and its end 436 (Figure 1) indicates the limit of crank throw increase.

A double throw switch 438 (Figures 1, 2 and 30) (preferably a toggle switch) controls the circuits including the contact plates 412 and 423 and the coils 296a and 323a. This switch is fixed to the apron with the switch 339 which is of the same construction. They each have an arm 2 (Figure 30) pivoted at 3 to a fixed support 4 and are provided with an insulated switch blade 5 which may contact with contacts 6 or 7. The controllable power-engaged reciprocating clutch mechanism described herein is the subject matter of a divisional application, Serial No. 533,726, filed May 2, 1944.

A tracer has its base support 440, Figures 1, 2, 12, 13, 14 and 24, secured to the upper end of a supporting tube 441 by nuts 442 (Figures 12 and 13). This base support has a side plate 443 bent upward through which an adjustable pivot screw 444 extends and locked by a nut 446. At its opposite side, the base has a plate 449 to support a second pivot screw 450 locked by a nut 451.

A swinging plate 453 has flanges 454 and 455 to engage the pivot screws. This plate is fixed by screws 456 to an insulating plate 457, which is secured to the end of a lever arm 459 by screws 460 (Figure 13). It also has a socket screw 461 which is locked by a nut 462.

A ball extension 463 at the upper end of the tracer bar 465 engages with the socket screw to provide operative movement of the lever arm 459.

The upper end of the tracer bar has a torque rod 467 (Figures 12, 13 and 24) secured thereto and engaging in a slot 468 in the flange 454 at a point opposite to the ball extension 463 to prevent any rotary movement of the tracer bar.

Figure 18:
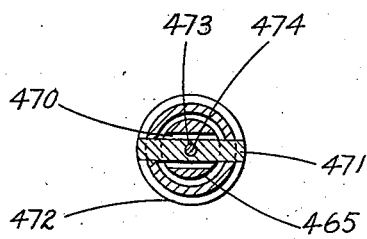
Figure 18 is a cross-sectional view of the tracer bar taken on line 18—18 of Figure 13.

At a point near its lower end, the tracer bar is provided with a crosswise opening 470 (Figures 13 and 18) through which an operating plate 471 extends. This plate is locked to the lower end of the supporting tube by a nut 472 to permit of limited free movement of the tracer bar 465 in all directions.

The operating plate has a cone shaped depression 473 on its upper surface which engages with a cone shaped end of an operating pin 474. This pin is secured in the tracer bar and is of hardened material, as is also the plate.

The lower end of the tracer bar has a slotted bore 478 to hold the shank of a tracer point 480. A tapered nut 481 locks the tracer point in position.

The tracer point has a finish cut section 482 and a rough cut section 485 (Figures 2, 13, 24 and 25).

The contact pressure of the operating plate and the pin is provided by a tension spring 483 having one end secured to a plate 489 fixed to the base support and adjusted by a knurled nut 484 (Figures 12, 13 and 24).

Any side movement of the tracer point, in any direction, will cause endwise movement of the tracer bar and the lever arm 459 will be moved to make and break the control circuits. Direct pressure on the lower end of the tracer point will also move the lever arm in like manner.

The lever arm 459 has a sidewise extension 486 (Figure 12) which has an electric contact 487 secured to its lower surface.

The contact 487 matches with a like contact on the upper side of the free end of a contact spring 490 which is secured at its opposite end to the base support by screws 492. These screws are insulated from the contact spring by insulating washers and by insulating plates 495 and 496 (Figure 13) which also insulate the contact spring from the base support.

A second completely insulated contact spring 498 is also secured by the screws 492 and the insulating plates.

The contact spring 490 is adjusted as to upward spring tension by a screw 499 which is secured in the insulating plate 496 and passes through enlarged holes in both the base support and the contact spring 498. The contact spring 498 is likewise adjustable as to upward tension by a screw 500 which passes through an enlarged hole in the base support and carried by the plate 496.

The contact spring 498 is provided with a contact point 502 on its upper side, at its free end, which matches with a contact carried by a contact plate 504 fixed to the base support but insulated therefrom.

The lever arm 459 has a second sidewise extension 506 (Figure 12) which has a contact point 508 on its upper side which matches with a contact on the lower surface of the free end of a contact spring 510. This contact spring is secured to an insulating plate 512 by screws 514 which pass through an insulating plate 516 (Figure 13) and through enlarged holes in a second contact spring 517 to insulate the contact springs from each other and from the base support.

The insulating plate 512 is secured to the side 443 of the base support by screws 519 (Figure 12).

A screw 522 threaded in the insulating plate 512 and passing through an enlarged hole in the contact spring 517, serves to control the downward spring tension of the contact spring 510. A like screw 523 controls the tension of the contact spring 517.

The contact spring 517 carries a light insulating plate 524 secured to its lower surface to provide operative contact with the contact spring 510. A similar insulating plate 501 is secured to the upper surface of the contact spring 498 to provide operative contact with the contact spring 490. These plates should be secured solidly to their contact springs and should be as light as possible to permit of quick contact spring action.

The lower surface of the free end of the contact spring 517 is provided with a contact point 525 which matches with a like contact on the upper surface of an equalizer lever 527 which is pivoted at one end to an insulated bearing pin 529 secured to the side 443 of the base support by a nut 530 and insulating washers (Figure 12).

At its opposite end, the equalizer lever is attached to one end of a comparatively heavy tension spring 534 which is secured at its opposite end to an insulated bracket 535 secured to the side 443 by screws 536 and insulating plates 538 (Figure 12).

The equalizer lever is adjusted by a micrometer screw 540 having screw engagement with the bracket and having end engagement with the equalizer lever. It is provided with a graduated head 541 and an indicator pin 543 inserted in the bracket.

At a point one-half way between its pivot point and its contact point, the equalizer lever is provided with an insulating stop 542.

The stop is solidly secured to the lever by screws 545 and is provided with a central opening 546 (Figure 14) through which the lever arm 459 extends for free vertical movement.

The stop is just wide enough to prevent the lever arm from contacting both contact spring 490 and contact spring 510 at the same time.

A contact arm 548, Figures 12 and 13, has a contact point 549 which normally contacts with a like contact on a second spring contact arm 551. These contact arms are secured to a side extension 552 (Figure 12) of the insulating plate 512 by screws 553 which pass through enlarged holes in the contact arm 551 to insulate the arms from each other.

The free end of the spring contact arm is provided with a downward extending insulating block 555 (Figure 13) secured by a screw. When the tracer point is deflected beyond its normal operating limits, the lever arm 459 will contact the block and break contact between the contact arms and open all the circuits controlled by the tracer.

The supporting tube 441 of the tracer has an adapter sleeve 550, Figures 2, 24 and 25, which is secured to the tube by a setscrew 561 which also slides in a vertical slot 563 in a supporting guide 564 to prevent rotation.

The supporting guide is slotted and adjustable by screws 569 to provide a close sliding fit for the sleeve.

The guide is rigidly secured to the outer end of a tracer supporting arm 570 which has slots 572 (Figure 1) through which bolts 573 secure the guide to the cross slide of the lathe.

The tracer is moved vertically to change its guiding contact with the pattern, or to prevent contact with it, by means of the following mechanism:

The adapter sleeve 550 is provided with a horizontal slot 575 (Figure 25) in which the formed edge 577 of a lengthened tracer setting lever 578 slides. This lever has bearings in projections 579 and 580 on the upper surface of a switch support 581 which is rigidly secured to the bracket 51 by screws 583 extending upward through the bracket (Figures 24 and 25).

The tracer setting lever has an angled extension 584 (Figures 24, 25 and 26) which slides in an opening 586 of a shifter arm 587 to operate the lever by movement of the shifter arm.

The shifter arm is fixed to one end of a shifter rod 589 which slides endwise in its bearings 590 (Figures 1 and 2).

The opposite end of the shifter rod is linked to the end of a manually operated tracer control 592 which is pivoted at 9 to the carriage and is provided with a vertical operating arm 10.

The pinion 53 has a tubular extension 597 (Figures 1, 24 and 25) which extends through the shifter arm for both rotary and a limited end movement. A collar 598 threaded on the extension, limits its end movement.

The shifter arm has a downward extending projection 599 which may contact with a cone shaped end 600 of a shifter collar 601 (Figures 1, 25, 26, 27 and 28) which is carried by the splined shaft and which may be set in any position by a setscrew 603 (Figure 25).

Four swinging contact arms 604, 610, 632 and 638, Figures 24, 25 and 26, of identical construction, are pivoted at 605 (Figures 25 and 26) to the lower side of the switch support.

The contact levers 604 and 610 are pivoted to a connecting bar 613 to swing in unison during the control movements.

The swinging levers 632 and 638 are likewise linked together by a connecting bar 645 to swing in unison.

The connecting bar 613 has a sidewise extended end 618 (Figures 25, 26 and 27) which connects with a downward extended end of an arm 619 secured to the lower end of a bearing sleeve 620 which has its bearings on a vertical bearing pin 621 inserted in the switch support.

The upper end of the sleeve 620 has an arm 623 secured thereto to move in unison with the levers 604 and 610.

The connecting bar 645 also has a sidewise extended end 646 to operatively connect with a downward extended end of an arm 648 of a bearing sleeve 649 which has its bearings on the outside of the bearing sleeve 620. The sleeve 649 has an arm 650 fixed to its upper end to move in unison with the levers 632 and 638.

The downward extended end of the swinging lever 604 may contact with the angled end 608 of a contact strip 609 (Figures 1, 24 and 25) which may be riveted to the pattern.

This strip acts to deflect the lever 604 to control the circuits for automatically varying the throw of the crank shaft during cylindrical turning operations, through the longitudinal component, only, of the tracer movement.

The lever 610 may contact the end of a contact strip 554 when the pattern support has been placed in its reversed position for boring operations (Figure 26). This will likewise vary the crank throw through the longitudinal component of the tracer movement.

The arm 623 which operates the crank throw controls by the cross feed component of the tracer movement, may contact with the angled end of a contact strip 626 secured to a contact plate 627 with thick washers 629 to bring the strip to its proper operating height.

The contact plate is fixed to the tracer supporting arm by screws 630 (Figures 1, 24 and 26).

The end of the lever 632 may contact the angled end of a second contact strip 636 secured to the pattern 46 during turning operations to alter the tracer control of the feed mechanism.

The end of the lever 638 may likewise contact the angled end of a contact strip 642 on the pattern 552 to alter the tracer control during boring operations.

In both cases, the control is by the longitudinal component of the tracer movement.

The arm 650 may contact the end of a second contact strip 651 secured by thin washers to the contact plate 627. This contact strip acts to alter the tracer control of the feed mechanism by the cross feed component of the tracer movement.

To provide operative contact with the various contact strips, tension springs 615 (Figure 24) having one of their ends secured to the bars 613 and 645 and their other end secured to pins 616 secured to the switch support, provide the necessary pressure.

An automatic snap switch to control the throw of the crank shaft is assembled with an identical switch to alter the tracer action. The first switch is placed directly below the second and both are secured by a common bracket 660 to the switch support. These switches and their operating mechanism are shown in Figures 1, 24, 25, 26 and 27.

A vertical pin fixed in an insulating base 663 (Figures 1, 26 and 27) provides the bearing for one end of a switch arm 688 (Figures 26 and 27). The switch arm is linked by an insulating rod 656 to the arm 648 to move therewith to alter the tracer movement.

A switch contact arm 668 (Figure 26) is pivoted on a pin fixed in the insulating base to likewise swing sidewise.

The free end of this arm has a contact at its side which may contact with a like contact fixed to a plate 673 which is secured to the insulating base. At its opposite side, the arm has a second contact point which may contact with a like point at the end of an adjustable screw 675 in a plate 676 which is also secured to the insulating base.

The outer end of the switch arm 688 has a vertical pin 680 (Figures 25, 26 and 27) to which one end of a tension spring 679 is secured. The opposite end of the spring is fixed to a vertical pin 677 in the end of the contact arm 668.

The spring shifts the contact connections of the contact arm when the switch arm 688 has passed the critical point in moving in either direction.

A second switch arm 683 (Figures 25, 26 and 27) is linked to the outer end of the arm 619 by an insulating connecting rod 685 (Figures 25 and 26) to move in unison with the levers 604 and 610 and the arm 623 to vary the crank throw. This switch arm is pivoted to its insulating base 687 (Figure 27) in the manner previously described.

A second contact arm 698 is also pivoted to the insulating base (Figure 26) to contact with a contact point on a plate 691 (Figure 27). It may also contact with the end of a contact screw 693 (Figure 27) which is supported by a plate secured to the base.

A vertical pin 695 at the end of the switch arm (Figures 25 and 26) has one end of a tension spring 696 secured thereto and its other end secured to a like pin 689 (Figure 26) to provide reversal of the contact connections.

An automatically operated snap switch to control reversal of longitudinal feed is shown in Figures 25, 26, 27 and 28.

A downward extending projection 700 (Figures 25, 27 and 28) of the switch support, provides bearings for a shaft 702 (Figures 26, 27 and 28) having an integral arm 703 at one end and a switch lever 705 solidly secured to the other. The switch lever may swing to the limits fixed by pins 707 secured to the switch support, and its lower end may contact with the angled face 600 (Figure 25) of the shifter collar 601 to throw the switch in the reverse direction.

A second shaft 709 (Figures 26, 27 and 28) has like bearings in the projection 700 and carries an arm 710 to which is secured a contact plate 712 (Figures 27 and 28) by screws 713 and insulating washers.

The end of the contact plate has a contact point on one side which may contact with a like point on a contact member 718 which is secured to the projection 700 by insulating plates and a screw 723 (Figures 27 and 28). At its opposite side, the contact plate carries a second contact point which may contact with a like contact point on a second contact member 728 which is secured to the projection 700 by insulating plates and a screw to insulate it from its support and from the member 718.

A sidewise extending pin is secured to the fre end of the arm 703 to which is secured one end of a tension spring 736 (Figures 26, 27 and 28). The other end of the spring is secured to a like pin secured to the end of the arm 710. This spring acts to reverse the contact connections of the contact plate when the switch lever has passed its critical point.

A pin 738 (Figures 26, 27 and 28) is secured to the extension 599 of the shifter arm to contact with the upper arm of the switch lever 705 to re-set the switch. This is done by manual operation of the shifter control 592.

Mechanism to automatically stop all feeding movements when the spindle rotation stops is shown in Figure 11.

A supporting frame 740 is secured to the lathe headstock 34 by a screw 741 (Figure 1). It has two arms 743 and 744 which carry bearings 735 through which a rotatable shaft 746 extends. This shaft has a gear pinion 747 secured to one end which meshes with a gear wheel 748 rotatably secured to the lathe spindle (Figure 1).

The opposite end of the shaft is drilled endwise to receive a hardened governor pin 750 which is free to slide endwise.

A yoke 752 is secured to the shaft by a pin 754 in position to prevent end motion of the shaft.

Two levers 757 are pivoted by pins 758 to opposite arms of the yoke and have governor weights 759 at their outer ends. Their inner ends 761 are closely fitted between flanges 763 of a governor sleeve 764 which is free to move endwise on the shaft. This sleeve is provided with a cross-pin 766 which extends through a slot 767 cut crosswise through the shaft. The cross-pin engages with the inner end of the governor pin for its control movements.

The cross-pin also engages with the end 769 of the slot to limit the end movement of the sleeve.

The outer end of the governor pin engages a hardened plate 770 secured to the free end of a contact spring 771. This spring has a contact point 772 which matches with a like point 774 on a contact arm 775.

The contact spring and the contact arm are both supported by insulating blocks 776 and 777 and by a screw 779 to the arm 743 to provide insulation of the parts.

An adjusting screw 780 is threaded through an insulating bushing 781 which is inserted in the arm 743. The end of the screw extends through an enlarged opening in the contact spring to adjust the contact arm.

A light tension spring 783 has one end secured to a sidewise extending projection 785 of one governor weight, and its other end secured to the end of a screw 786 which is supported by a projection 788 on the opposite governor weight. The tension of this spring is controlled by a knurled nut 789.

A stop and go switch for the feed mechanism is operated by the tracer shift control 592 and is shown in Figure 1.

A switch lever 11 is hinged at one end to a connecting blade 12 which is secured to an insulating block 13 fixed to the lathe carriage. This block also carries a contact blade 14 which is insulated from the other parts.

The free end of the switch lever is linked by an insulating connecting rod 15 to the tracer shift control 592 to close the switch when the tracer is moved to its operating position.

A transformer 798, Figure 2, operating on an alternating current lighting circuit to deliver current at approximately 18 volts, is secured to the bottom of the clutch case by screws 799.

This transformer is in very common use and its construction is well known.

A braking drag mechanism to insure proper operation of the clutch mechanism, is shown in Figures 3, 4 and 5.

A comparatively stiff leaf spring 800 has a brake shoe 801 fixed to its upper end to bear against the periphery of the clutch member 89.

At its lower end, the spring is secured by screws 803 to a projection 805 of the clutch case base which also has an adjusting screw 806 to vary the brake action.

The oscillating sleeves 100 and 100a must be held closely supported endwise to prevent noise due to the rapid reversal of end pressures by the clutch operating mechanism.

Stiff spring washers 810 (Figures 1, 3, 4 and 5) are secured by an adjusting nut 811 (Figures 1, 3, and 5) to one end of the clutch shaft to automatically maintain end pressures sufficiently high to prevent knocking. The nuts 811 are locked in place by jam nuts 813.

An alternate form of adjustable throw crank shaft, adapted to operate two clutch mechanisms, is shown in Figure 31.

In this form, a crank shaft 820 has a crank head 821 to which a crank throw member 822 is pivoted by a bearing pin 824. The crank throw member provides bearings for a connecting rod 825 which has its free end connected by a bearing bolt 826 to a downward extended end of an arm 627 of an oscillating sleeve.

The crank throw member has a pin 828 which co-operates with an adjusting nut 829 and an adjusting screw 830 to vary the crank throw.

All these parts are identical with like parts in the regular mechanism and operate in the same manner.

A second crank throw member 831 is of the same construction as the member 822, but without the pin 828. It provides bearings for a second connecting rod 833 which is connected in like manner to an arm 859 of a second oscillating sleeve.

The crank throw member 831 is provided with a bearing pin 835 which bears in a crank support 837 which is identical with the counterbalance support 105 of the regular construction but somewhat longer to provide greater bearing.

A counterbalancing lever 839, is also of the regular construction, and has its bearings on the crank shaft. It has one arm 840 engaging in a slot 841 in the crank throw member 831, while its opposite arm 843 engages in a slot 844 in the crank throw member 822.

This lever 839 provides equal and opposite throw of the crank throw members.

To provide operation of the hook-levers for clutch control with this modification, an eccentric bushing 850 is secured to rotate with the crank shaft and to provide bearings for a connecting rod 851 which operates one set of hook-up levers. A second connecting rod 853 is hinged to the first by a pivot pin 854 to operate a second set of hook-up levers.

Two eccentric bushings having their crank throw rotated 180 degrees relative to each other, may be used for independent connecting rod operation of the hook-up levers instead of the mechanism here shown. Owing to its better balance, the oppositely moved connecting rods are desirable where high oscillating speeds are used.

An alternate form of clutch plate is shown in Figure 32.

A clutch plate 860 is adapted to be secured in the clutch head in the regular manner as previously described.

The contact faces 862 are curved for clutch roller contact and may be formed to correspond to arcs having their radial points 864 at one side of the center line 865.

*Operation of the mechanism in turning when using automatic feed shifts*

The work 37, the tool 41, and the pattern 46 are placed in position for cylindrical turning as shown in Figure 1.

The tracer shift control 592 is moved to the position shown in Figure 1 to raise the tracer point above the pattern to prevent damage to the tracer mechanism when shifting position. The carriage and the cross slide are then moved to bring the tracer point to its starting position at 870 (Figure 1).

The carriage is connected to the lead screw in the regular manner.

The motor 87 is started. This is preferably operated from an alternating current lighting circuit to drive the crank shafts 80 and 80a at 2400 R. P. M. and give 40 feeding movements per second, in either direction, for both clutch members.

In machining this piece, a feeding rate of 2.4 inches per minute of the carriage is desired. The switch 330 is therefore deflected by the operator in the direction indicated by the indicator arm 401a relative to the index 435, which is visible from the operating position.

This will energize the proper shifter coil, 296a or 323a, and the star wheel 130a will be engaged to change the throw of the crank shaft. When the indicator arm has reached the point corresponding to a crank throw that will give this feeding rate of the crank shaft 80a, the switch is disconnected.

A feeding rate of 2.4 inches per minute is also desired for the cross slide, except in turning the cylindrical portion 877 (Figure 1) of the work. In this portion, a feeding rate of .3 of an inch is to be automatically obtained.

While the switch 880 (Figure 30) is still open, as is required for manual adjustment of the throw of the crank shaft 80, the setting levers 363 and 395 are moved to their maximum and minimum setting position, respectively. The crank shaft is then adjusted by manual operation of the switch 438 to give a feeding rate of 2.4 inches per minute, in the manner just described. The setting lever 395 is then set to the 2.4 inch setting, while the setting lever 363 is set for .3 inch feed per minute, and the switch 880 closed for automatic control.

The tracer shift control 592 is moved to its running position which closes the switch 11 (Figure 1) and shifts the pinion 53 into mesh with its driving gear 57. It also re-sets the switch lever 785 to feed the carriage toward the lathe head and lowers the tracer point into position for rough turning contact with the pattern as shown in Figures 24 and 25.

The power to rotate the lathe spindle is thrown in which completes the feeding circuits by bringing the contact spring 771 into contact with the arm 775 through action of the centrifugally operated mechanism.

At the starting point 870, the tracer point has not yet contacted the pattern and the tracer contacts are in the position shown in Figure 13. In this position, the arm 459 and the contact spring 490 are in contact to complete the circuit through the coil 232 by the connections shown in Figure 30. This coil controls the hook-up lever 189 which is permitted to swing outward to take the position shown for the hook-up lever 188 in Figure 5.

The reciprocating movement of the carrier head, moves the hook-up lever into contact with the arm 195 which is forced from its central, inoperative position to rock the lever 199 on its bearings. This swings the yoke 112 on its pivots 116, independent of its oscillating movement, and the clutch rollers 91 are forced into driving contact between the clutch plates 93 and the bore of the clutch member 89 to move the cross slide and the tracer in the in-feed direction.

The eccentric bushing 170 is so set on the crank shaft 80 as to force the clutch roller contact shortly before the start of the connecting rod 153 on its stroke.

Upon completion of one-half of the stroke of the connecting rod, the direction of movement of the carrier head is reversed but the pressure on the clutch rollers is still maintained through action of the spring 201.

Upon further movement of the carrier head, this pressure drops and the positive driving contact of the clutch rollers is maintained by means of the braking drag 801 which is adjusted to prevent clutch over-throw due to the inertia of the clutch mechanism.

Upon reversal of movement of the connecting rod, the clutch rollers are released from their drive and return to their central, inoperative position through action of the spring of the lever 109 and the arm 114; and also of the detent 215.

During the above described stroke of the connecting rod, the cross slide has been moved the distance of one one-thousandth of one inch and has become stationary until the beginning of the next stroke of the connecting rod in the same direction. This is repeated as long as the coil 232 is energized, and the tracer point will contact at the point 871 (Figure 1) on the pattern.

The tracer point is deflected by this contact to move the tracer contacts into the position shown in Figure 15. The contact spring 498 is permitted to contact the plate 504 and the coil 232a is energized.

The hook-up lever 189a is then permitted to swing to its operative position and the clutch rollers 91a are forced into driving contact to move the carriage toward the head of the lathe.

The operation of the clutch mechanism controlled by the coil 232a is identical with that controlled by the coil 232 and the carriage will be moved the distance of one one-thousandth of an inch for each revolution of the crank shaft 80a.

It will be noted that carriage and the cross slide are here moving at the same time and at the same feeding rate.

When the cross slide has moved to further deflect the tracer point, the connection between the arm 459 and the contact spring 490 is broken and the coil 232 becomes inoperative. The hook-up lever 189 is returned to its inoperative position and the carriage alone, moves.

When the tracer point has reached the point 872 (Figure 1) of the pattern, it will be further deflected and the contacts will take the position shown in Figure 16. The arm 459 will then engage the contact spring 510 and the coil 247 will be energized. This will force engagement of the clutch rollers 91 when the connecting rod 153 is moving in the opposite direction to that previously described and the cross slide will be moved to the same extent in the out-feed direction.

The carriage and the cross slide are now moving at the same time and will so continue to move until the tracer point is further deflected to bring the tracer contacts to the position shown in Figure 17. The contact between the contact spring 517 and the equalizer lever 527, which heretofore has been continuous, is broken and the carriage movement stopped. The cross slide then continues in the out-feed direction until a change in the contour of the pattern reduces the pressure on the tracer point. The tracer contacts will then return to the position shown in Figure 16 and re-engagement of the contact spring 517 and the equalizer lever 527 will again move the carriage.

It will be noted that the contour of this pattern is such that the cross slide and the carriage are both moving during a considerable portion of the time until the tracer point reaches the point 874 (Figure 1). At this point, a reduction of the cross slide feed to .3 of an inch per minute is to be obtained, automatically.

To obtain this, the contact strip 609 may be used to deflect the swinging lever 604 to reverse the connections of the switch contact arm 698 and energize the shifter coil 323. This acts to reduce the crank throw to the low limit allowed by the setting lever 363.

However; this form of pattern is not suitable for this operation by the longitudinal component of the tracer movement, as it would be necessary to bring it into operation when the tracer point has reached, approximately, the point 873 on the pattern to insure reliable operation. This would result in considerable loss of time, due to the reduced feeding rate.

To prevent this loss, the contact strip 609 is removed and the tracer permitted to continue at the regular feeding rate until the point 874 has been reached. The arm 623 is then moved by the contact strip 626 carried on the tracer support 570 to likewise reverse the switch connections and reduce the cross feed rate.

Shortly after the point 874 has been reached, the carriage will again move, due to the change in the pattern. The swinging lever 632, which controls the action, will then contact the end of the contact strip 636 and is deflected thereby. This reverses the connections of the switch contact arm 668 and the tracer control of the cross slide will be cut out. At the same time, the contact springs 498 and 517 will be shorted to permit of continued carriage movement without regard to their contact connections.

The carriage will then continue until the lever is released by reaching the opposite end of the contact strip 636. The switch arm 698 thus is reversed and the tracer restored to its normal operation.

Continued carriage movement then brings the extension 599 of the shifter arm into contact with the cone shaped end of the shifter cone 601 and the tracer point is raised to its finish cut position.

The cross slide will then move at a feeding rate of .3 inch per minute in the in-feed direction to very closely adjust the tool for the finishing cut.

A slight further movement of the carriage acts to move the switch arm 705 to reverse the connections of the contact arm 712. This energizes the coil 247a and the direction of the carriage feed is reversed.

When the carriage has moved in the reverse direction a short distance, the contact strip 636 will again act to render the tracer inoperative. This takes place before the tool has reached the cylindrical portion 877 of the work being turned.

The tool, which is of a form that will cut equally well in either direction, will therefore finish the cylindrical portion of the work at the very close setting given it by the tracer before the work is reached. The diameter of the finished work is therefore determined by that point on the pattern at which this setting took place.

It is therefore not necessary to so accurately finish the entire length of a pattern controlling a cylindrical portion of the work.

When the tool has almost completed this cylindrical portion, the lever 632 will be released by the contact strip 636 and the tracer will again be restored to its normal operation.

The action then continues until the point 874 is reached on the return movement. The arm 623 is here released by the contact strip 626 to reverse the connections of the switch arm 698 and restore the feeding rate of 2.4 inches per minute of the cross slide.

The tracer will then continue to control the tool until the work is finished.

The carriage movement will then continue until the end 886 (Figure 1) is reached on the pattern and the tracer point further deflected to bring the tracer contacts into the position shown in Figure 17. The carriage movement is then stopped and the cross slide is moving in the out-feed direction. This movement will continue until the reversed stop 887 (Figure 1) is contacted. As the cross slide movement cannot be stopped by any normal tracer action it will continue until the insulating block 555 contacts the arm 459 and the connection between the spring 551 and the contact arm 548 is broken. All circuits controlled by the tracer are thereby opened and all feeding movements stop.

By releasing the shifter cone 601, the feed circuits will be opened by a stop 890 on the pattern at the end of the rough cut. By operation of the shifter control lever to release the cross slide and by releasing the carriage from the lead screw, the tracer may be returned to its starting point 870 and reingaged for the finishing cut by first moving into the rough cut position and then raising the tracer to the finish cut position by operation of the shifter control.

Interrupted patterns may be used.

*Longitudinal boring*

By reversing the tracer connections to the coils 232 and 247 (not shown) and mounting the pattern in the position shown in Figure 26, the machining operations will be identical with those used in turning.

Face plate turning is done by reversing the cross feed and carriage control coil connections to the tracer (not shown).

*Inertia counterbalance*

The clutch rollers and cage reciprocate at varying amplitude as determined by the throw of the crank shaft. The rollers must remain in their central position when operation is not desired. Small roller clearance is also required to permit small engaging movements.

The clutch rollers and cage are made as light as possible but their inertia make it impossible to prevent undesired roller engagement by the centralizing action of the lever 109 and the arm 114 and also of the detent spring 215, unless such spring action is prohibitively heavy.

An oppositively moved inertia counterbalance is therefore provided and light spring pressure used to centralize.

The effect of the counterbalance is very critical and very slight overbalancing requires excessive engaging pressure.

The inertia counterbalancing should be such that there is no variation in clutch engagement from minimum to maximum crank throw.

Crank shaft balancing

When the crank throw has been reduced to its lowest limit there is no reciprocating movement of the associated parts and rotary balance is required, only. This should be within close limits and counterweights 169 (Figure 8) are therefore provided.

In the regular construction, any deflection of the crank throw member provides an equal and opposite movement of the counterbalance and the rotating balance is thereby maintained for all crank throw adjustments.

The reciprocating balance is most accurately secured by equal and opposite movement of like parts. Such balancing is secured in the modification shown in Figure 31 which also maintains a rotary balance for all crank adjustments.

In the regular construction, the reciprocating balance is best secured by so meshing the gear 82 and 82a that like parts are reciprocated in opposite directions.

In some installations, a single clutch unit operated by a variable throw crank shaft is used. In such cases there is no counteracting reciprocating mechanism, and the reciprocating balance is then approximated by a slight excess in rotary counterbalancing (not shown) at the greatest crank throw, but with correct balance when the crank throw has been reduced to its lowest limit.

The reciprocating and rotating parts associated with the carrier head may be counterbalanced by any of the well known methods.

To provide the best operating efficiency, relative to the tracer action and for the power required, the connecting rod operated by the crank shaft 80 is at one end of its stroke when the connecting rod operated by the crank shaft 80a has made one-half its stroke. Such construction is shown in Figure 4.

Gear variations

A variation of 100 to 1 is readily obtained by variation of the crank throw, which may done while the mechanism is in productive operation. Intermediate gears may then be used to secure the desired feed change range required by the mechanism.

In some installations the gear variation may be secured, independent of the crank throw variation, by the use of change gear such as the gears 67, 69 and 70 in Figure 1.

It is also sometimes desirable to operate the cross slide by the feed rod 48 (Figure 2) instead of by the splined shaft. This may be done through intermediate gear (not shown) connections of the feed rod to the clutch shaft 72.

Crank shaft speeds

Much higher rotative speed than 2400 R. P. M. has been used. The feeding steps are consequently smaller for any fixed feeding rate and closer work results. However, the wear on the reciprocating parts increases very rapidly at the higher speed. Quietness of operation is also largely determined by the rotative speed.

Tracer adjustments

The tension of the spring 483 is so adjusted that the tracer contacts are held in the position shown in Figure 13 when the tracer point is not deflected.

A safe margin of pressure over the opposing pressure of the very flexible contact spring 498 is maintained to insure reliable operation. The contact pressure of this spring should be reduced to a low limit by the adjusting screw 500. This reduces the pressure required for tracer point deflection.

As previously noted, the stop plate 542 is wide enough to prevent the contacts, within close limits, operating to move the cross slide in both directions at the same time.

The extent of movement of the tracer point allowed, in the overlapping of the contact connections which give simultaneous carriage and cross slide feed, is determined by the micrometer screw 540 which so adjusts the equalizer lever that the amount of feeding overlap is varied equally in both directions at the same time. The extent of permissible overlapping of the feeds is governed largely by the throw of the crank shaft and should be reduced to its low limit when using the finer feeds. The position taken by the lever arm 459, when the tracer point is undeflected, is determined by the adjustment of the socket screw 461.

An oil retaining ring 1 (Figure 5) is snapped into the end of the clutch member to aid in the lubrication of the clutch rollers and associated mechanism.

Needle bearings (not shown) may be substituted for the bearing bushings 101 and 126.

Low tension direct current may be used to operate the coils controlling the feed mechanism. It is more quiet in operation but more costly, due to supply source.

Other means than the variable throw crank have been constructed to give variable reciprocating movement to the clutch mechanism, and may be substituted therefor. They have been found undesirable on account of the greater inertia forces involved.

Direct coil action on the lever 199 has been used. The action is slow and prohibitive power is required.

The mechanism above described is subject to many modifications and I do not wish to be limited to any fixed construction, but claim the invention broadly and all equivalents.

I claim:

1. In a mechanism controlled by a pattern to produce work, a pattern, a member mounted for relative feeding movement, a tracer controlled by the pattern, a clutch mechanism under the control of the tracer to control the feeding movement, and a power mechanism having adjustable reciprocating motion to actuate the clutch at a variable rate of feeding movement.

2. In a mechanism controlled by a pattern to produce work, a pattern, a member mounted for relative feeding movement, a tracer under control of the pattern, a clutch mechanism under control of the tracer to control the feeding movement, a power mechanism having adjustable reciprocating motion to actuate the clutch mechanism, and means to vary the extent of the reciprocating motion by remote control.

3. In a mechanism controlled by a pattern to produce work, a pattern, a member mounted for relative feeding movement, a power mechanism to move the member toward and from the pattern and also transversely thereof, a tracer co-operating with the member and the pattern to control the power mechanism, and contacts directly controlling the power mechanism and directly operated by the tracer to control the toward and from and the transverse movements when closed and to stop all of the movements when the circuits controlled thereby are opened.

4. In a mechanism controlled by a pattern to produce work, a pattern, a member mounted for relative feeding movement, a reciprocating power mechanism to move the member toward and from the pattern and also transversely thereof, a tracer co-operating with the member and the pattern to control the power mechanism, and means actuated by one component of the movement of the member and independent of the tracer to interrupt the tracer control of the power mechanism in one direction.

5. In a mechanism controlled by a pattern to produce work, a pattern, a member mounted for relative feeding movement, a tracer under control of the pattern, a clutch mechanism under control of the tracer to control the feeding movement, a power mechanism having adjustable reciprocating motion to actuate the clutch mechanism, and means under control of the member to vary the reciprocating motion.

6. In a mechanism controlled by a pattern to produce work, a pattern, a member mounted for relative feeding movement, a reciprocating power mechanism, a clutch mechanism reciprocated by the power mechanism and provided with a clutch member adapted to be moved into operation to move the member, a counterbalance for the clutch member reciprocating therewith to reduce the inertia effects due to reciprocating motion, and a tracer controlled by the pattern to determine the control movements of the clutch member.

7. In a mechanism controlled by a pattern to produce work, a pattern, a member mounted for relative feeding movement, a power mechanism adapted for reciprocating motion, a clutch mechanism reciprocated by the power mechanism and having a clutch member adapted to be moved into operative position for direct or reverse movement, pressure means to hold the clutch member out of operative position when inoperative, and a tracer controlled by the pattern to control the clutch member for movement of the member.

8. In a mechanism controlled by a pattern to produce work, a member mounted for relative feeding movement, a power mechanism adapted to give reciprocating movements of varying amplitude, a clutch mechanism actuated by the power mechanism and adapted to transmit its complete reciprocating movement to move the member, and a tracer to control the clutch mechanism.

9. In a mechanism controlled by a pattern to produce work, a member mounted for relative feeding movement, a power shaft having a variable crank throw to variably reciprocate a clutch, a counterbalance for the crank throw adapted to be varied simultaneously with the crank throw to maintain the balance, and a tracer to control the clutch for the feeding movement.

10. In a mechanism controlled by a pattern to produce work, a member mounted for relative feeding movement, a reciprocating power mechanism, a clutch mechanism actuated by the power mechanism and having a clutch member adapted to be moved into operative position in either direction to provide direct and reverse feed motion to the member, a power means to move the clutch member into operative position and a tracer to control the power means.

11. In a mechanism controlled by a pattern to produce work, a member mounted for relative feeding movement, a reciprocating power mechanism, a clutch mechanism actuated by the power mechanism and provided with a clutch member adapted to be moved into operative position to move the member, a reciprocating power means, a hook-up mechanism to transmit motion from the power means to the clutch member, and a tracer to control the hook-up mechanism.

12. In a mechanism controlled by a pattern to produce work, a member mounted for relative feeding movement, a power mechanism having variable reciprocating motion, a clutch mechanism actuated by the power mechanism and provided with a clutch member adapted to be moved into operative position to move the member, a power means, a hook-up mechanism to transmit motion from the power means to the clutch member, and a tracer to control the hook-up mechanism.

13. In a mechanism controlled by a pattern to produce work, a member mounted for relative feeding movement, a power mechanism having adjustable reciprocating motion, a clutch mechanism actuated by the power mechanism, a tractor to control the clutch mechanism for feeding movement of the member, means to vary the reciprocating motion of the power mechanism when in motion, and a control for the varying means.

14. In a mechanism controlled by a pattern to produce work, a member mounted for relative feeding movement, a power mechanism adapted to give variable reciprocating motion to a clutch to vary its feeding rate, a tracer to control the clutch for the feeding movement of the member, power means to vary the reciprocating motion, a control for the power means, and means cooperating with the power mechanism to limit the action of the power means.

15. In a mechanism controlled by a pattern to produce work, a member mounted for relative feeding movement, a reciprocating power mechanism, a clutch mechanism actuated by the power mechanism and having a clutch member adapted to be moved to an operative position to move the member, moving means to bring the clutch member to operative position, a tractor to control the moving means, and a transformer adapted to provide low tension alternating current for the tracer control.

16. In a mechanism controlled by a pattern to produce work, a pattern, a member mounted for relative feeding movement, a power mechanism to move the member toward the pattern and transversely thereof, a tracer cooperating with the member and the pattern to control the power mechanism, contacts directly controlling the power mechanism and controlled by direct action of the tracer lever to control the toward and transverse movements when closed and to stop the movements when the circuits directly thereby are opened, and a limited overlapping of the tracer controls to give simultaneous feed in both directions.

17. In a mechanism controlled by a pattern to produce work, a pattern, a member mounted for relative feeding movement, a power mechanism to move the member away from the pattern and transversely thereof, a tracer cooperating with the member and the pattern to control the power mechanism, contacts directly controlling the power mechanism and controlled by direct action of the tracer lever to control the away from and the transverse movements when closed and to stop the movements when the circuits directly controlled thereby are opened, and a limited overlapping of the tracer controls to give simultaneous feed in both directions.

18. In a mechanism controlled by a pattern to produce work, a pattern, a member mounted for relative feeding movement, a power mechanism to move the member toward and from the pattern and transversely thereof, a tracer cooperating with the member and the pattern to control the power mechanism, contacts directly controlling the power mechanism and directly made by the tracer lever to control the toward and from and the transverse movements when closed and to stop the movements when the circuits directly controlled thereby are opened, and means to stop all movements of the member when the tracer lever has been moved excessively.

19. In a mechanism controlled by a pattern to produce work, a pattern, a member mounted for relative feeding movement, a tool operable upon the work, the relative position of the tool and work being determined by the movement of said member, a power mechanism to move the member toward and from the pattern and transversely thereof, a tracer to control the power mechanism and having a tracer point provided with a surface to contact the pattern to define a roughing-cut relation between the tool and the work when transversing the member in one direction and a surface to contact the pattern to define a finishing-cut relation between the tool and the work when transversing in the other direction, means to reverse the direction of transverse movement, and means controlled by the movement of the member to change the tracer point contact with the pattern.

20. The combination with relatively movable tool and work supports, of a feed device for actuating one of said supports with respect to the other, a tracer positioned with respect to one of said supports, and a pattern with respect to the other, and tracer controlled means for actuating said device, said means comprising a reciprocable driver, power means for the reciprocation of the driver, a clutch member connected with the driver for reciprocation therewith, a driven clutch member operatively connected with the said device, means for selectively clutching said members for the transmission of motion in but one direction of reciprocation of the driver, and a tracer controlled selector means for actuating said member clutching means.

21. The structure of claim 20 in which the respective clutch members have opposed wedging surfaces oppositely inclined and a rolling element is positioned between said surfaces and selectively engageable with either for effecting the clutching of said members.

22. The device of claim 20 in which the power actuating means and the driver are respectively operable upon predetermined centers and the connections therebetween include a crank, a connecting rod, and a lever, and means for adjusting the radius of said connections with respect to at least one of said centers whereby to vary the stroke of said driver.

23. The device of claim 20 in which the means for clutching said members include a power operated element, a drivable clutch engaging element, latch members mounted upon one of said elements and adjustable to and from engagement with the other to receive motion therefrom in either direction, and tracer controlled electromagnetic means for tilting the respective latch members.

24. The device of claim 20 in which the respective clutch members have opposing wedge surfaces with oppositely inclined portions and in combination with a rolling wedge between said surfaces, a cage engaging said wedge for the selective movement thereof in opposite peripheral directions respecting one of said members for engagement with either of the oppositely inclined surface portions of the other for selective transmission of motion between said members in only one direction of reciprocation of the driving member, a lever connected with the cage for the shifting thereof, a power actuated driving lever movable in proximity to the lever first mentioned, latch means pivotally connected to one of said levers and individually movable into the path of the other lever to receive motion therefrom for the shifting of the cage and wedge, armature levers respectively mounted to actuate the respective latch means, and electromagnets in operative association with the respective armature levers and provided with tracer controlled energizing circuits.

25. The combination with tool carrier and work carrier members mounted for relative movement and driving connections for the actuation of one of said members respecting the other, of tracer controlled means regulating the operation of said connections and including a driving element rotatable upon a predetermined axis and having a crank, a driven element oscillatable upon a predetermined axis and having a lever, power transmitting means linking the crank and the lever for the oscillation of the driven element upon the rotation of the driving element, and means for varying the stroke of said power transmitting means upon the driven element, and tracer controlled uni-directional clutch means for delivering motion from the driven element to said connections in either direction of oscillation of the driven element to the extent to which the driven element is variably oscillated.

26. The combination with a tool support and a work support mounted for relative movement, a feed for the actuation of one of said supports with respect to the other in a traverse direction, a second feed for the actuation of one of said supports with respect to the other in a direction to engage and disengage the tool respecting the work, and a tracer fixed with reference to one of said supports and a pattern fixed with reference to the other, of a plurality of contacts connected to be opened and closed by the tracer upon engagement with the pattern, clutch controlled driving connections for the respective feeds including clutch actuating means subject to the control of the respective tracer contacts, whereby the tracer controls both directions of feed of the supports with respect to the other, reciprocating means for actuating said connections in predetermined increments, and means for relatively varying the increments in which said connections respond upon the closing of the respective contacts.

27. The device of claim 26 in which driven clutch elements are individually connected to the respective feeds, driving clutch elements are associated therewith, tracer controlled means engage said clutch elements selectively upon the closing of the respective contacts, lever means variable as to its radius of movement about its fulcrum operates each of the driving clutch elements, and a power driven crank shaft oscillates the respective lever means to move the driving clutch elements through a range of oscillation according to the radius of the respective lever means, the adjustment of the respective lever means as to radius providing for the variation in relative feed.

28. The combination with tool and work supports mounted for movement in a traverse direction and an in and out feed direction, of separate feed mechanisms for moving said supports relative to each other in the respective directions, a tracer fixed with reference to one of said supports, and a pattern with respect to the other, and driving means for the respective mechanisms provided with separate contacts controlled by said tracer, the mechanism for moving said supports in a traverse direction having a normally open contact and a normally closed contact in series, and the mechanism for feeding the tool support in toward the work support having a normally closed contact, and mechanism for feeding said supports away from each other having a normally open contact, the several contacts having means for their successive operation by the tracer whereby the infeed contact normally closed will remain closed after the traverse contact is closed and the traverse contact will remain closed after the infeed contact opens and after the outfeed contact closes, the outfeed contact remaining closed until after the traverse contact opens.

29. The combination with a work support and a tool support mounted for in and out movement, of means for producing a traverse movement of the respective supports, and tracer control connections for effecting in and out movement between the respective supports, a tracer being positioned with reference to one of said supports and a pattern with respect to the other, the tracer having portions projecting differentially toward the pattern at different levels, and means for adjusting the level of the tracer respecting the pattern, whereby to register said portions selectively with the pattern according to the depth of cut to be made in the work by the tool.

30. The combination with a work support and a tool support mounted for relative movement, of reversible means for traversing one of said supports respecting the other, reversible means for moving one of said supports to and from the other, a tracer part connected with one of said supports and a pattern part with the other, means operative upon the pressure engagement of said parts to control the in and out feed of said supports respecting each other, one of said parts having portions at different levels projecting differentially toward the other of said parts, and means for variably adjusting the relative levels of said parts, whereby variably to position the work support and the tool support for roughing and finishing cuts respectively.

31. The device of claim 30 in conjunction with means for reversing the direction of traverse between the respective supports, and means for concurrently adjusting the relative level of said parts in a direction to permit a closer approach of the respective parts and the respective supports in the reverse direction of traverse movement between the respective supports.

32. In a machine tool, the combination with a work support and a tool support and means for rotating one of said supports with respect to the other, and means for feeding one of said supports with respect to the other, of a governor connected with the rotatable support, means for electrically regulating the feed of said supports with respect to each other, a switch controlling said electrical regulating means, and a connection from said governor for the closing of said switch, said switch including normally open contacts adapted to be closed only when the rotatable support reaches a predetermined speed determinable by the governor.

33. In a mechanism controlled by a pattern, a pattern, a member mounted for movement relative to the pattern, an electric control circuit, a power mechanism controlled thereby to relatively move the member, a circuit closing means in the control circuit, a second circuit closing means in series with the first circuit closing means, and a tracer adapted to be controlled by the pattern to close both of the circuit closing means to move the member and to open one of them to stop the movement.

34. In a mechanism controlled by a pattern, a pattern, a member mounted for movement relative to the pattern, a power mechanism to move the member, a control circuit for the power mechanism, a circuit closing means in the control circuit, a second circuit closing means in the control circuit in series with the first circuit closing means, and a tracer under control of the pattern and having a tracer bar adapted to move endwise in a control movement to close both of the circuit closing means to move the member and to open one of them to stop the movement.

35. In a mechanism controlled by a pattern, a pattern, a member mounted for relative movement toward and from the pattern, power means to move the member, a tracer adapted to control the power means by contact with the pattern, pattern contacting parts carried by the tracer and projecting differentially toward the pattern at different levels, and means to automatically change the relative contact level of the pattern and the tracer contact parts to vary the relative position of the member and the pattern.

36. In a machine tool, the combination of a work support and a tool support and means to rotate one of the supports with respect to the other, power means to move one support relative to the other, a pattern, a tracer controlled by the pattern to control the power means, and means operated by the rotative support to interrupt the tracer control when the rotative speed has dropped to a predetermined limit.

37. In a mechanism controlled by a pattern, a pattern, a member mounted for relative feeding movement, power mechanism to move the member toward and from the pattern and also transversely thereof, a tool carried by the member for rough-cut and finish cut operations, a tracer controlled by the pattern to control the power mechanism, said tracer being variable as to control distance between the cutting tool and tracer contact with the pattern to bring the tool into rough-cut and finish-cut positions, means controlled by movement of the member to automatically change the tracer from rough-cut to finish cut position, and means to automatically provide rough-cut and finish-cut movements of the member under control of the tracer.

38. In a clutch mechanism, a reciprocating power means, a clutch mechanism actuated by the power means and provided with a clutch member adapted to be moved into position to operate the clutch mechanism for either direction of movement, a reciprocating power device, and a hook-up mechanism operated by the power device to move the clutch member into operative position in a selected direction.

CHARLES K. SALISBURY.